United States Patent
Park

(10) Patent No.: US 10,582,519 B2
(45) Date of Patent: Mar. 3, 2020

(54) METHOD AND APPARATUS FOR TRANSMISSION/RECEPTION OF D2D SIGNAL

(71) Applicant: Innovative Technology Lab Co., Ltd., Seoul (KR)

(72) Inventor: Dong Hyun Park, Seoul (KR)

(73) Assignee: Innovative Technology Lab Co., Ltd., Seoul (KR)

(*) Notice: Subject to any disclaimer, the term of this patent is extended or adjusted under 35 U.S.C. 154(b) by 0 days.

(21) Appl. No.: 16/148,021

(22) Filed: Oct. 1, 2018

(65) Prior Publication Data

US 2019/0045518 A1    Feb. 7, 2019

Related U.S. Application Data

(63) Continuation of application No. 15/699,267, filed on Sep. 8, 2017, now Pat. No. 10,091,801, which is a
(Continued)

(30) Foreign Application Priority Data

Aug. 8, 2014   (KR) .................. 10-2014-0102675
Nov. 20, 2014  (KR) .................. 10-2014-0162802

(51) Int. Cl.
*H04W 72/10* (2009.01)
*H04W 8/00*  (2009.01)
(Continued)

(52) U.S. Cl.
CPC .......... *H04W 72/10* (2013.01); *H04W 8/005* (2013.01); *H04W 72/042* (2013.01); *H04W 76/14* (2018.02)

(58) Field of Classification Search
CPC .............................. H04W 72/10; H04W 8/005
See application file for complete search history.

(56) References Cited

U.S. PATENT DOCUMENTS

2013/0122893 A1   5/2013  Turtinen et al.
2016/0255670 A1   9/2016  Lee
(Continued)

OTHER PUBLICATIONS

"3rd Generation Partnership Project; Technical Specification Group Radio Access Network; Evolved Universal Terrestrial Radio Access (E-UTRA); Physical layer procedures (Release 12)," 3GPP TS 36.213 V12.2.0, Jun. 2014, pp. 1-207, 3GPP Organizational Partners.
(Continued)

*Primary Examiner* — Ronald B Abelson

(57) ABSTRACT

A method and apparatus for supporting a device-to-device (D2D) communication between user equipments (UEs) are provided. The method of a device-to-device (D2D) communication between user equipments (UEs), the method includes: receiving, at a transmission (Tx) UE, resource assignment information transmitted from an evolved NodeB (eNB), the resource assignment information being associated with a D2D discovery signal to be transmitted in a discovery period; determining, at the Tx UE, that a D2D discovery signal associated with a first discovery type and a D2D discovery signal associated with a second discovery type are to be transmitted in a first subframe included in the discovery period; and in the first subframe, transmitting the D2D discovery signal associated with the second discovery type and dropping the D2D discovery signal associated with the first discovery type.

18 Claims, 16 Drawing Sheets

Related U.S. Application Data continuation of application No. 14/819,201, filed on Aug. 5, 2015, now Pat. No. 9,788,339.

(51) Int. Cl.
*H04W 72/04* (2009.01)
*H04W 76/14* (2018.01)

(56) References Cited

U.S. PATENT DOCUMENTS

2016/0337839 A1   11/2016   Chae
2016/0338021 A1   11/2016   Chae

OTHER PUBLICATIONS

International Search Report for International Patent Application No. PCT/KR2015/008157, dated Dec. 15, 2015.
Written Opinion for International Patent Application No. PCT/KR2015/008157, dated Dec. 15, 2015.
NTT Docomo, Inc., "Views on D2D discovery resource allocation", R1-140630, 3GPP TSG RAN WG1 Meeting #76, Prague, Czech Republic, Feb. 10-14, 2014, pp. 1-8, 3GPP.
ZTE, "Discussion on the coordination of D2D resource for inter-cell D2D discovery and communication", R3-140047, 3GPP TSG RAN WG3 Meeting #83, Prague, Czech Republic, Feb. 10-14, 2014, pp. 1-6, 3GPP.
NCE, "On resource allocation for inter-cell discovery", R1-140493, 3GPP TSG-RAN WG1 Meeting #76, Prague, Czech Republic, Feb. 10-14, 2014, pp. 1-8, 3GPP.
Catt, "D2D discovery resource allocation within network coverage", R2-132533, 3GPP TSG RAN WG2 Meeting #83, Barcelona, Spain, Aug. 18-23, 2013, pp. 1-4, 3GPP.

METHOD AND APPARATUS FOR TRANSMISSION/RECEPTION OF D2D SIGNAL

CROSS-REFERENCE TO RELATED APPLICATIONS

This application is a continuation of U.S. application Ser. No. 15/699,267, filed on Sep. 8, 2017, which is a continuation of U.S. application Ser. No. 14/819,201, filed on Aug. 5, 2015, which claims priority from and the benefit of Korean Patent Application Nos. 10-2014-0102675, filed on Aug. 8, 2014, and 10-2014-0162802, filed on Nov. 20, 2014, all of which are hereby incorporated by reference in its entirety.

BACKGROUND

1. Field

The present disclosure relates to wireless communication and, more particularly, to a method and apparatus for transmitting and receiving a Device-to-Device (D2D) signal.

2. Discussion of the Background

Long Term Evolution (LTE) of $3^{rd}$ Generation Partnership Project (3GPP) allows supporting a Proximity Service (ProSe) so as to satisfy demands associated with public safety. As a discovery technology and broadcasting communication are added to the ProSe, there is a desire for a technology for providing compatibility in an LTE system.

Device-to-device (D2D) communication relates to a communication method having been available since the era of an analog two-way radio and has been used over the very long history. However, D2D communication in a wireless communication system is distinguished from existing D2D communication.

The D2D communication in the wireless communication system indicates communication that uses a transmission and reception technology, for example, a physical channel, of the wireless communication system in a frequency band of the wireless communication system or a band excluding the frequency band, and in this instance, enables user data to be directly transmitted and received between devices, for example, user equipments (UEs), without using an infrastructure, for example, an evolved-NodeB (eNB). That is, two UEs function as a source and a destination of data, respectively, and perform communication. Such a method enables wireless communication to be available in an area outside a limited wireless communication infrastructure and also decreases network load of the wireless communication system.

The D2D communication may be performed through a communication method of using an unlicensed band of a wireless local area network (WLAN), such as Institute of Electrical and Electronics Engineers (IEEE) 802.11, or Bluetooth. However, the communication method using the unlicensed band may not readily provide a planned and controlled service. In particular, performance may be significantly degraded due to interference. On the other hand, D2D communication operated or provided in a licensed band or an inter-system interference controlled environment may support the relatively high quality of service (QoS), may improve the frequency use efficiency through a frequency reuse, and may also increase a communicable distance.

In the case of D2D communication using the licensed band, that is, D2D communication based on cellular communication, resources for D2D communication may be allocated through an eNB. For example, cellular uplink (UL) channels or UL subframes may be used as resources to be allocated. The D2D communication includes D2D data communication and D2D control signal communication. Unlike cellular communications, the D2D communication may be performed without a control by a network. Thus, a plurality of D2D signals may be overlapped in the same time with respect to a UE, for example, a collision of the plurality of D2D signals may occur. Accordingly, there is a need to prevent and/or resolve such a problem.

Also, a User Equipment (UE) having a single transceiver chain is incapable of executing simultaneous transmissions/receptions through various frequency bands. Accordingly, for effective D2D communication in a licensed band, there is a need of assigning a priority a signal for processing D2D signals when a collision occurs among the D2D signals.

SUMMARY

Exemplary embodiments relate to a method and apparatus for transmitting and receiving a Device-to-Device (D2D) signal.

Exemplary embodiments also relate to a method and apparatus for determining priority for a Device-to-Device (D2D) signal.

Exemplary embodiments also relate to a method and apparatus for transmitting and receiving a Device-to-Device (D2D) signal based on priority.

Exemplary embodiments also relate to a method and apparatus for prohibiting collision among Device-to-Device (D2D) signal based on priority.

An exemplary embodiment discloses a method of a device-to-device (D2D) communication between user equipments (UEs), the method including: receiving, at a transmission (Tx) UE, resource assignment information transmitted from an evolved NodeB (eNB), the resource assignment information being associated with a D2D discovery signal to be transmitted in a discovery period; determining, at the Tx UE, that a D2D discovery signal associated with a first discovery type and a D2D discovery signal associated with a second discovery type are to be transmitted in a first subframe included in the discovery period; and in the first subframe, transmitting the D2D discovery signal associated with the second discovery type and dropping the D2D discovery signal associated with the first discovery type.

An exemplary embodiment discloses a transmission (Tx) user equipment (UE) to execute a device-to-device (D2D) communication with a reception (Rx) UE, the Tx UE including: a wireless transceiver configured to receive resource assignment information transmitted from an evolved NodeB (eNB), the resource assignment information being associated with a D2D discovery signal to be transmitted in a discovery period, and transmit a D2D discovery signal to a Rx UE; and one or more processors configured to determine that a D2D discovery signal associated with a first discovery type and a D2D discovery signal associated with a second discovery type are to be transmitted in a first subframe included in the discovery period, and in the first subframe, transmit the D2D discovery signal associated with the second discovery type and drop the D2D discovery signal associated with the first discovery type.

An exemplary embodiment discloses a method of a device-to-device (D2D) communication between user equipments (UEs), the method including: receiving configuration information for a D2D communication from an evolved NodeB (eNB); receiving, at a transmission (Tx) UE, information of a resource pool transmitted from the eNB, the information of the resource pool being associated with a first D2D discovery signal transmission; receiving, at the Tx Ue, discovery resource information associated with a second D2D discovery signal transmission, the discovery resource information indicating a specific resource for the second D2D discovery signal transmission; determining the second D2D discovery signal transmission through the specific resource, the specific resource including a first subframe and a second subframe; determining the first D2D discovery signal transmission through a resource selected from the resource pool, the selected resource including the second subframe and a third subframe; and executing the second D2D discovery signal transmission in the second subframe, and dropping the first D2D discovery signal transmission in the second subframe.

According to one or more exemplary embodiments, when a collision occurs among D2D signals, a User Equipment (UE) may execute transmission and reception of a D2D signal based on a priority, and efficiency of D2D discovery and D2D communication may be generally secured.

DETAILED DESCRIPTION OF THE ILLUSTRATED EMBODIMENTS

Figure 1:
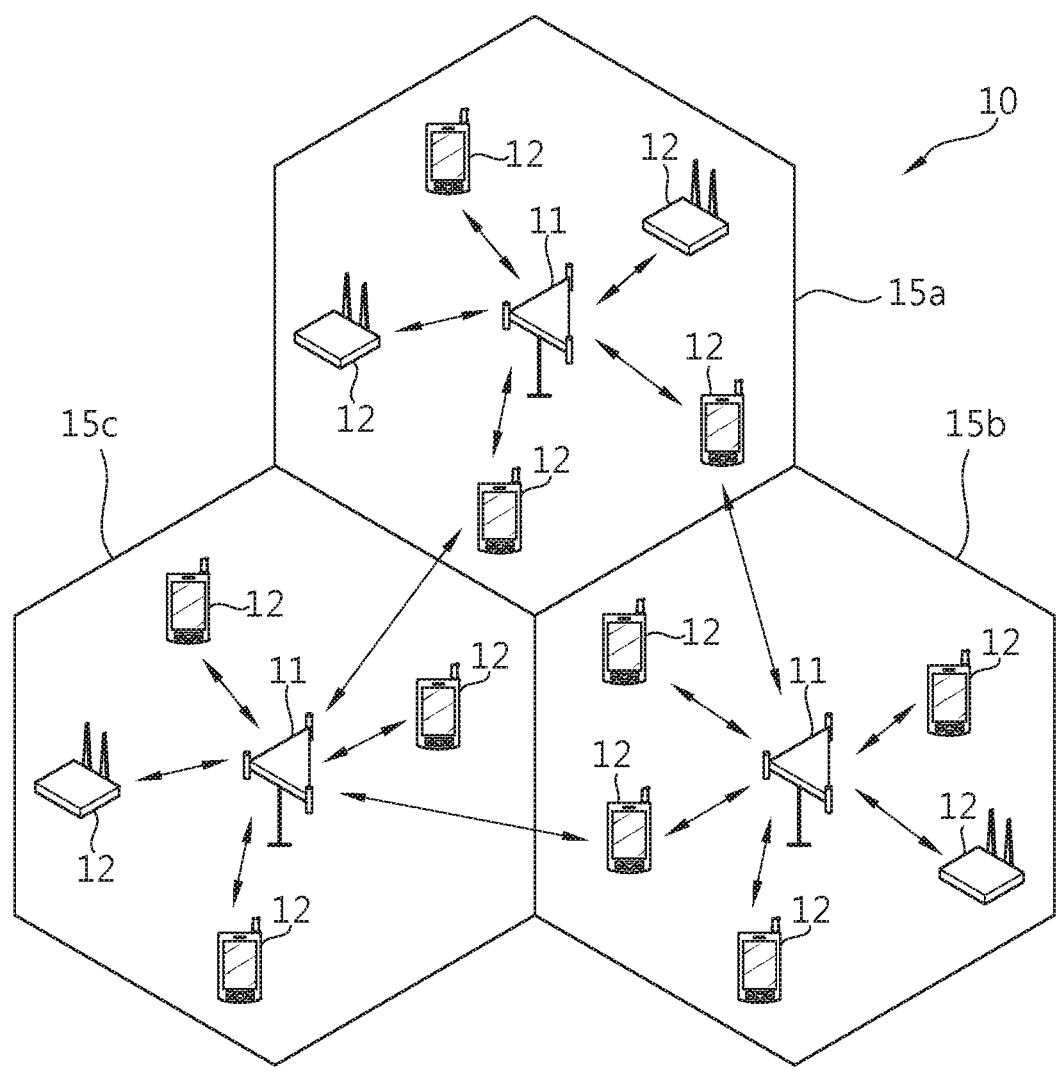
FIG. 1 is a block diagram illustrating a wireless communication system according to one or more exemplary embodiment.

Exemplary embodiments will be described more fully hereinafter with reference to the accompanying drawings, in which exemplary embodiments of inventive concept are shown. Throughout the drawings and the detailed description, unless otherwise described, the same drawing reference numerals are understood to refer to the same elements, features, and structures. In describing the exemplary embodiments, detailed description on known configurations or functions may be omitted for clarity and conciseness.

Further, the terms, such as first, second, A, B, (a), (b), and the like may be used herein to describe elements in the description herein. The terms are used to distinguish one element from another element. Thus, the terms do not limit the element, an arrangement order, a sequence or the like. It will be understood that when an element is referred to as being "on", "connected to" or "coupled to" another element, it can be directly on, connected or coupled to the other element or intervening elements may be present.

Several aspects of telecommunication systems will be described with reference to various apparatuses and methods. Various blocks, modules, components, circuits, steps, processes, algorithms, operations, etc. (collectively referred to as "elements") will be described with references to various apparatuses and methods. These elements may be implemented using electronic hardware, computer software, or any combination thereof.

For example, an element, or any portion of an element, or any combination of elements may be implemented with a processing system that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various operations described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, or otherwise.

In one or more exemplary embodiments, the operations and/or functions described may be implemented in hardware, software, firmware, or any combination thereof. If implemented in software, the operations and/or functions may be stored on or encoded as one or more instructions or code on a computer-readable medium. Computer-readable storage medium may include non-transitory storage media. The storage media may be any available media that can be accessed by a computer. For example, the storage media may include Random Access Memory (RAM), Read-Only Memory (ROM), EEPROM, CD-ROM, or other optical disk storage, magnetic disk storage or other magnetic storage devices, or any other medium that can be used to carry or store desired program code in the form of instructions or data structures and that can be accessed by a computer. However, types of computer-readable medium are not limited thereto.

FIG. 1 illustrates a wireless communication system according to one or more exemplary embodiments.

Referring to FIG. 1, the wireless communication system 10 is widely located to provide a variety of communication services such as a voice service and a packet data service. The wireless communication system 10 includes one or more evolved-NodeBs (eNBs) 11. Each eNB 11 provides a communication service to a predetermined cell, for example, cells 15a, 15b, and 15c. Here, the cell may be divided into a plurality of areas (also, referred to as sectors).

User equipment 12 (UE) may be located at a certain location or portable, and may also be referred to as different terms, including MS (mobile station), MT (mobile terminal), UT (user terminal), SS (subscriber station), wireless device, PDA (personal digital assistant), wireless modem, and handheld device. An eNB 11 may also be referred to as BS (Base Station), BTS (Base Transceiver System), Access Point, femto base station, Home nodeB, relay and the like. A cell inclusively refers to various coverage areas, such as mega cell, macro cell, micro cell, pico cell, and femto cell. A cell may be used as a term for indicating a frequency band that a BS provides, a coverage of a BS, or a BS.

Hereinafter, the term downlink refers to communication from a base station 11 to a UE 12, and the term uplink refers to communication from a UE 12 to a base station 11. For downlink, a transmitter may be part of a base station 11, and a receiver may be part of a UE 12. For uplink, a transmitter may be part of a UE 12 and a receiver may be part of a base station 11. There is no limitation in the multiple access method applied to a wireless communication system. Diverse methods can be used, including CDMA (Code Division Multiple Access), TDMA (Time Division Multiple Access), FDMA (Frequency Division Multiple Access), OFDMA (Orthogonal Frequency Division Multiple Access), SC-FDMA (Single Carrier-FDMA), OFDM-FDMA, OFDM-TDMA, OFDM-CDMA. Uplink transmission and downlink transmission can use either TDD (Time Division Duplex), which uses different time locations for transmissions, or FDD (Frequency Division Duplex), which uses different frequencies for transmissions.

The layers of a radio interface protocol between a UE and a BS may be classified as a first layer (L1), a second layer (L2), and a third layer (L3), based on three low layers of an Open System interconnection (OSI) model, which is well known in association with a communication system. A physical layer belonging to the L1 among the layers, provides an information transfer service using a physical channel.

A physical layer is connected to a media access control (MAC) layer corresponding to an upper layer through a transport channel. Data is transferred between the MAC layer and the physical layer through the transport channel. The transport channel is classified based on a method used to transport data through a radio interface. Further, data is transferred between different physical layers, for example, between a physical layer of a user equipment (UE) and a physical layer of an eNB through a physical channel. The physical channel may be modulated using an orthogonal frequency division multiplexing (OFDM) method and uses, as radio resources, a time, a frequency, and a space generated with a plurality of antennas.

Figure 2:
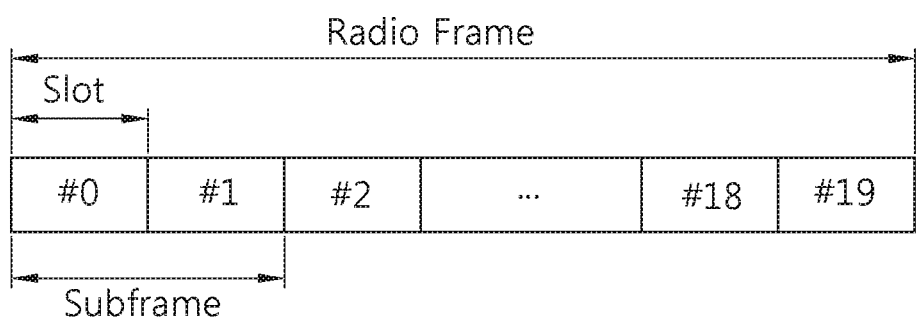
FIG. 2 and FIG. 3 are diagrams schematically illustrating a structure of a Radio Frame (RF) according to one or more exemplary embodiments.
Figure 3:
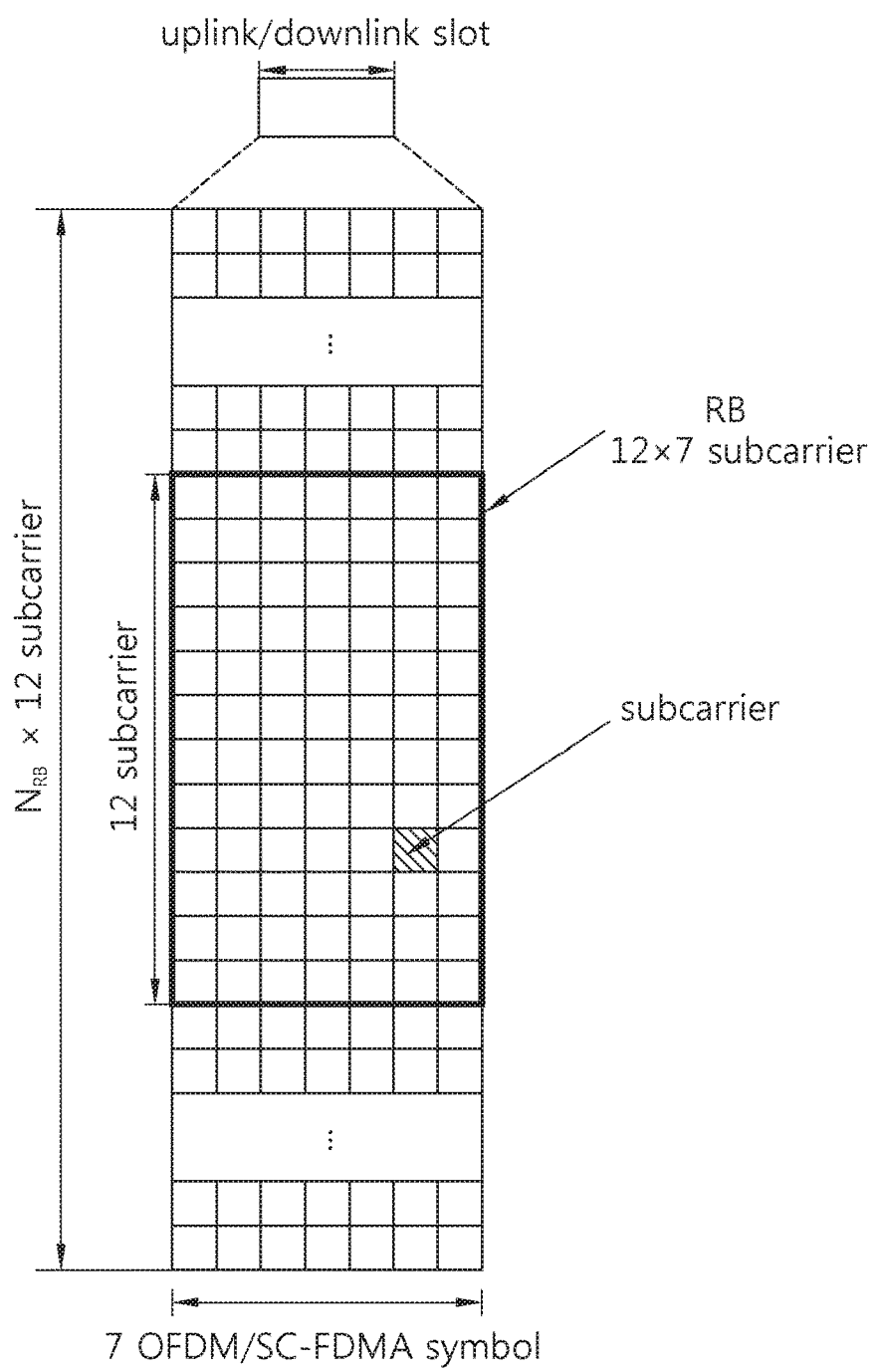

FIG. 2 and FIG. 3 are diagrams schematically illustrating a structure of a Radio Frame (RF) according to one or more exemplary embodiments. FIG. 2 illustrates a concept of a D2D communication based on a cellular network, and FIG. 3 illustrate an exemplary structure of configuring D2D discovery resources.

Referring to FIG. 2 and FIG. 3, a radio frame may include ten subframes. A single subframe includes two slots. A time (a length) in which a single subframe is transmitted is referred to as a Transmission Time Interval (TTI). Referring to FIG. 2, for example, a length of a single subframe (1 subframe) may be 1 ms, and a length of a single slot (1 slot) may be 0.5 ms.

A single slot may include a plurality of symbols in a time domain. For example, in a wireless system that uses Orthogonal Frequency Division Multiple Access (OFDMA) in a Downlink (DL), the symbol may be an Orthogonal Frequency Division Multiplexing (OFDM) symbol and in a wireless system that uses Single Carrier-Frequency Division Multiple Access (SC-FDMA) in an Uplink (UL), the symbol may be an SC-FDMA symbol. An expression associated with a symbol period of the time domain may not be limited by a multiple access scheme or name.

The number of symbols included in a single slot may be different based on a length of a Cyclic Prefix (CP). For example, in the case of a normal CP, seven symbols are included in a single slot, and in the case of an extended CP, six symbols are included in a single slot.

A Resource Element (RE) may be the smallest unit of a time-frequency resource to which a modulated symbol of a data channel, a modulated symbol of a control channel, or the like is mapped, and is a resource corresponding to a single symbol in the time domain and a single subcarrier in the frequency domain. A Resource Block (RB) is a resource allocation unit, and may be a time-frequency resource corresponding to 180 kHz in a frequency axis and a single slot in a time axis. The resource block may be referred to as a Physical Resource Block (PRB). A resource block pair refers to a resource block unit that includes two consecutive slots in a time axis.

Various physical channels may be used at a physical layer, and the physical channels (data corresponding to the physical channels) may be mapped to the radio frame and transmitted. As a downlink physical channel, PDCCH (Physical Downlink Control Channel)/EPDCCH(Enhanced PDCCH) informs a UE of a resource allocation of Paging Channel (PCH) and Downlink Shared Channel (DL-SCH) and information of Hybrid Automatic Repeat reQuest (HARQ) associated with DL-SCH. PDCCH/EPDCCH transfers an uplink grant, which informs a UE of a resource allocation of an uplink transmission. PDCCH and EPDCCH are different with respect to mapping resource regions. Physical DL-SCH is mapped to Downlink Shared Channel (PDSCH). Physical Control Format Indicator Channel (PC-FICH) informs a UE of the number of OFDM symbols used for PDCCH, and is transmitted in every subframe. Physical Hybrid ARQ Indicator Channel (PHICH) is a downlink channel and transfers an HARQ ACK(Acknowledgement)/NACK(Non-acknowledgement) signal, which is a response to an uplink transmission. HARQ ACK/NACK signal may be referred to as HARQ ACK signal.

As an uplink physical channel, Physical Random Access Channel (PRACH) transfers a random access preamble. Physical Uplink Control Channel (PUCCH) transfers uplink control information, such as HARQ ACK as a response to a downlink transmission, Channel State Information (CSI) to indicate a channel state of a downlink channel, e.g., Channel Quality Indicator (CQI), Precoding Matrix Index (PMI), Precoding Type Indicator (PTI), Rank Indicator (RI), and the like. Physical Uplink Shared Channel (PUSCH) transfers Uplink Shared Channel (UL-SCH), which is a data channel associated with control information of the PUCCH.

Uplink data may be transmitted on a PUSCH, and the uplink data may be a transport block (TB) that is a data block for a UL-SCH transmitted during a transmission time interval (TTI). The TB may include user data. Further, the uplink data may be multiplexed data. In the multiplexed data, the TB for the UL-SCH and uplink control information may be multiplexed. That is, when user data to be transmitted through an uplink is present, the UL control information may be multiplexed together with the user data and be transmitted through the PUSCH.

Recently, a method of supporting D2D communication that uses a transmission and reception technology of a wireless communication system in a frequency band of the wireless communication system or a band excluding the frequency band, and in this instance, enables user data to be directly transmitted and received between devices, for example, UEs without using an infrastructure, for example, an eNB, is in consideration. The D2D communication enables wireless communication to be available in an area outside of a limited wireless communication infrastructure and may also decrease network load of the wireless communication system. Also, the D2D communication may transmit disaster-related information to UEs even in a situation in which eNBs are not in normal operation due to, for example, a war and a disaster.

A UE to transmit a signal based on D2D communication is defined as a transmit UE (Tx UE) and a UE to receive a signal based on D2D communication is defined as a receive UE (Rx UE). The Tx UE may transmit a discovery signal and the Rx UE may receive the discovery signal. Roles of the Tx UE and the Rx UE may be switched. A signal transmitted from the Tx UE may be received by at least two Rx UEs. Also, signals transmitted by two or more Tx UEs may be selectively received by a single Rx UE. A D2D signal may be transmitted through an uplink resource. Therefore, a D2D signal may be mapped on an uplink subframe and may be transmitted from a Tx UE to an Rx UE. The Rx UE may receive a D2D signal on an uplink subframe.

Figure 4:
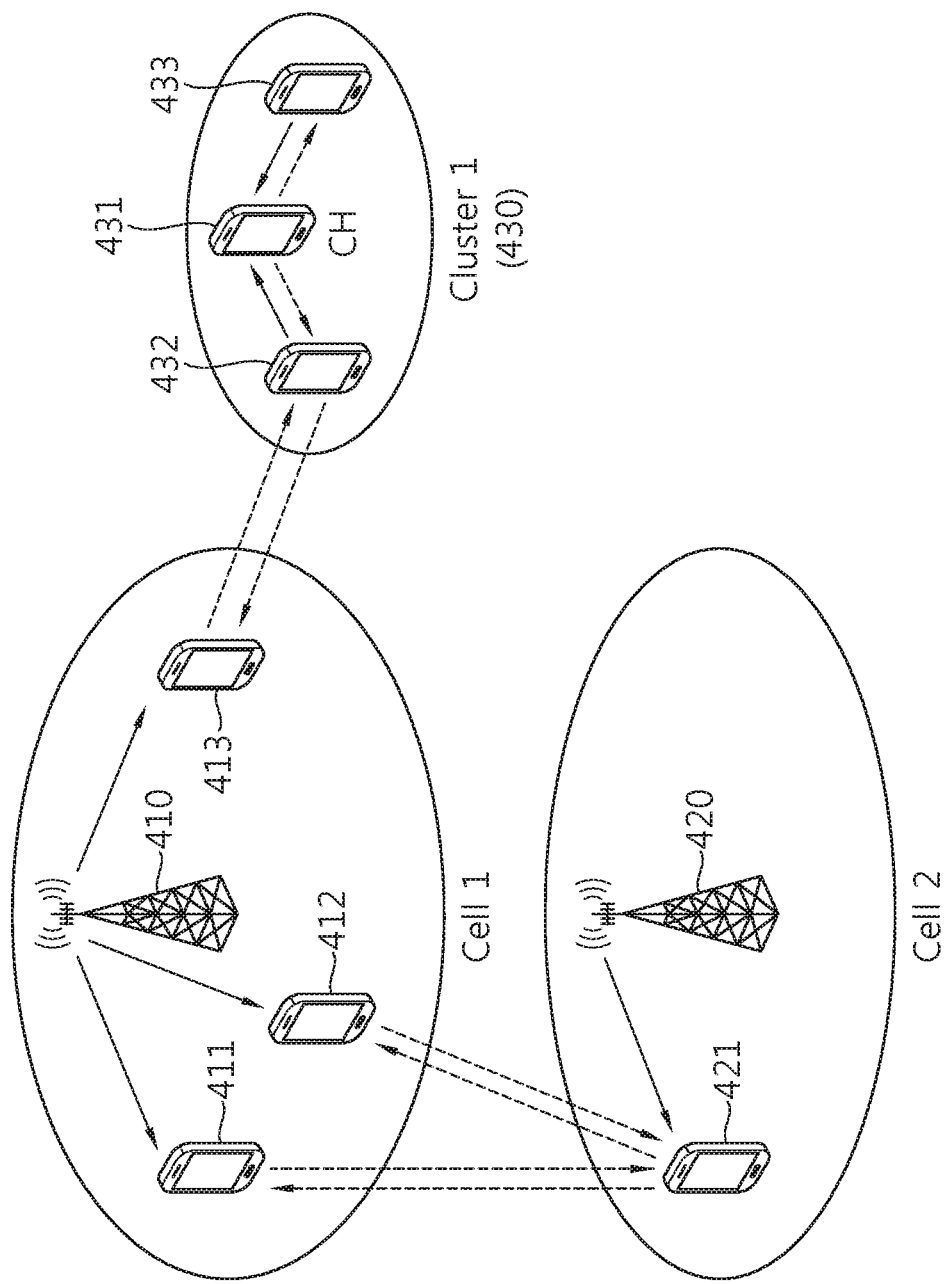
FIG. 4 illustrates an example of D2D communication based on a cellular network according to one or more exemplary embodiments.

FIG. 4 illustrates an example of D2D communication based on a cellular network according to one or more exemplary embodiments.

Referring to FIG. 4, a cellular communication network including a first eNB 410, a second eNB 420, and a first cluster 430 is configured. A first UE 411 and a second UE 412 located in a cell covered by the first eNB 410 perform communication through a general connection link, for example, a cellular link through the first eNB 410, which corresponds to an in-coverage-single-cell D2D communication scenario. The first UE 411 located in a coverage of the first eNB 410 performs D2D communication with a fourth UE 421 located in a coverage of the second eNB 420, which corresponds to an in-coverage-multi-cell D2D communication scenario. Also, a fifth UE 431 out of the network coverage may generate a single cluster, for example, the first cluster 430 together with a sixth UE 432 and a seventh UE 433 and may perform D2D communication with the sixth UE 432 and the seventh UE 433, which corresponds to an out-of-coverage D2D communication scenario. The fifth UE 431 may operate as a cluster head (CH) of the first cluster 430. The cluster head may refer to a reference UE, a node, or a unit, which serves as a reference for synchronization purpose, and assigns resources according to various purposes. The cluster head may include an independent synchronization source (ISS) for synchronizing out-of-coverage UEs. Further, a third UE 413 may perform D2D communication with the sixth UE 432, which corresponds to a partial-coverage D2D communication scenario.

D2D communication may include direct communication in which D2D UEs transmit and receive data and control information for the purpose of public safety. To support the D2D communication, a D2D discovery procedure and a D2D synchronization procedure may be executed. A D2D discovery signal may be used solely for commercial purposes, for example, advertizing or the like.

Related control information may be transmitted and received between UEs to perform D2D data transmission and reception through D2D communication. The related control information may be referred to as scheduling assignment (SA). An Rx UE may perform a configuration for D2D data reception based on the SA. The SA may include at least one of, for example, a new data indicator (NDI), a transmit UE identification (Tx UE ID), a redundancy version (RV) indicator, a modulation and coding scheme (MCS) indication, a resource allocation (RA) indication, and a power control indication.

Here, the NDI indicates whether a current transmission is repetition of data, that is, retransmission of the data or new data transmission. A receiver may combine the same data based on the NDI. A target ID indicates an ID for a UE to which a corresponding data MAC PDU is to be transferred. The data MAC PDU may be transmitted through group casting or broadcasting based on the ID value, and may be transmitted even through uni-casting based on the settings.

The RV indicator indicates a redundancy version by specifying different start points in a circular buffer for reading an encoded buffer. The Tx UE may choose different redundancy versions about repetition of the same packet based on the RV indicator. The MCS indication indicates an MCS level for D2D communication. The RA indication, e.g., transmission resource pattern indication, indicates a time/frequency physical resource allocated to transmit corresponding D2D data. The power control indication may be a command for controlling a magnitude of power to be suitable for a UE having receiving corresponding data to perform corresponding D2D transmission.

From the perspective of a Tx UE, the Tx UE may operate in two modes for resource allocation.

Mode 1 refers to a case in which an eNB or a relay node (hereinafter, the eNB may include the relay node) schedules a predetermined resource(s) for D2D communication. That is, in Mode 1, a predetermined resource(s) used for transmitting D2D data and D2D control information (SA) of the Tx UE is designated by the eNB or the relay node. Mode 2 refers to a case in which a predetermined resource(s) is selected directly from a resource pool. That is, in Mode 2, the Tx UE may directly allocate a predetermined resource(s) for transmitting D2D data and D2D control information.

A UE capable of performing D2D communication ("D2D capable UE") supports at least Mode 1 for in-coverage D2D communication. The D2D capable UE supports at least Mode 2 for out-of-coverage D2D communication or edge-of-coverage D2D communication.

In the case of mode 1, a location of a resource(s) for transmission of D2D control information and a location of a resource(s) for transmission of D2D data, may be given by a Base Station (BS). That is, when an identical grant for D2D SA and data transmission is given to a UE from the BS, by transmitting a (E)PDCCH in a DCI message format having a size identical to that of DCI format 0.

In the case of mode 2, a resource pool for transmission of D2D control information (e.g., SA) may be pre-configured and/or may be semi-statically allocated. In this instance, a Tx UE may select a resource for D2D control information from the resource pool, for transmission of the D2D control information.

D2D discovery may be executed on a D2D discovery resource. For example, a D2D UE may transmit a discovery signal through a discovery resource (hereinafter referred to as a D2D discovery resource) that is randomly selected (outside a network coverage) or is configured by a BS (inside a network coverage), with in a corresponding discovery period. In the case of random selection, the resource for transmission of a discovery signal may be determined, based on a fixed or adaptive transmission probability obtained from a pre-configured or configured normal transmission probability.

Figure 5:
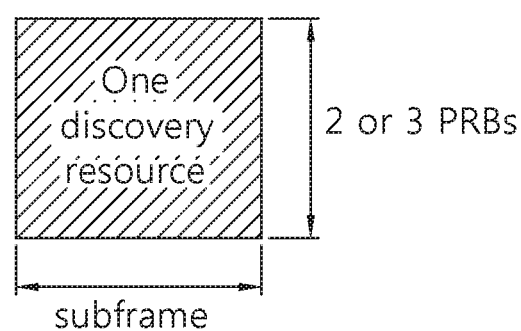
FIG. 5 is a diagram illustrating an example of a D2D discovery resource according to one or more exemplary embodiments.

FIG. 5 is a diagram illustrating an example of a D2D discovery resource according to an exemplary embodiment.

Referring to FIG. 5, a single D2D discovery resource may be formed of n contiguous PRBs in the frequency domain and a single subframe. In this instance, inter-slot frequency hopping is not executed in the subframe. n may be, for example, 2 or 3.

A set of D2D resources (hereinafter referred to as a 'D2D resource set') may be used for repeated transmission of a Medium Access Control Protocol Data Unit (MAC PDU) that delivers a discovery signal (hereinafter referred to as a discovery MAC PDU) within a discovery period.

Figure 6:
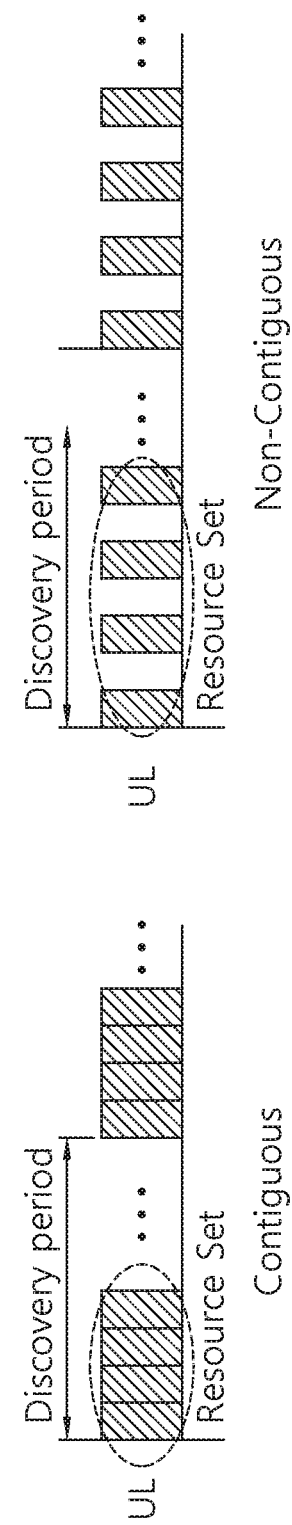
FIG. 6 is a diagram illustrating an example of a D2D discovery resource set according to one or more exemplary embodiments.

FIG. 6 is a diagram illustrating an example of a D2D discovery resource set according to an exemplary embodiment.

Referring to FIG. 6, a D2D discovery resource set within a discovery period may include contiguous D2D discovery resources or non-contiguous D2D discovery resources, in the time domain. That is, repeated D2D discovery resources in the D2D discovery resource set may be contiguous or non-contiguous in the time domain.

Figure 7:
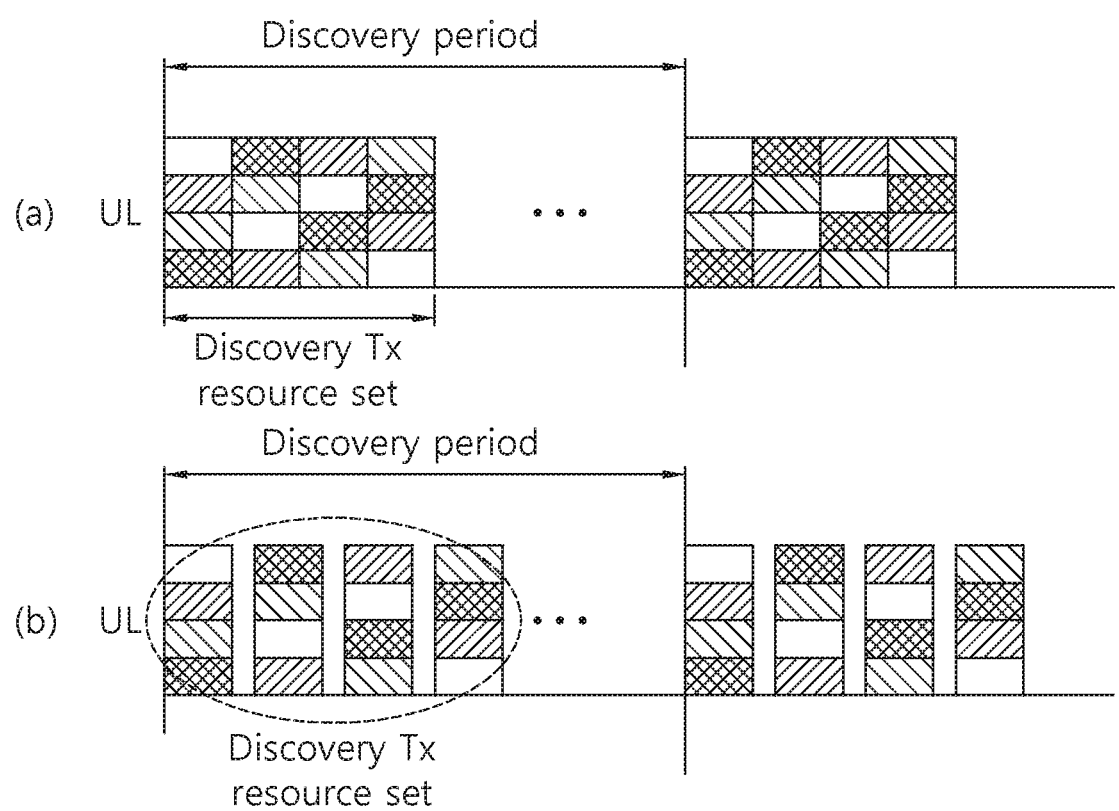
FIG. 7 is a diagram illustrating examples of a D2D discovery resource configuration structure in a D2D discovery resource set according to one or more exemplary embodiments.

FIG. 7 is a diagram illustrating examples of a D2D discovery resource configuration structure in a D2D discovery resource set according to an exemplary embodiment.

Referring to FIG. 7, patterns indicate resources included in each D2D discovery resource set. A plurality of D2D discovery resource sets may exist in a single discovery period, and D2D discovery resources in a single D2D discovery resource set may be contiguous (a) or non-contiguous (b) in the time domain, and may be arranged in the frequency domain based on frequency hopping (inter-subframe frequency hopping). From the perspective of an Rx UE, a discovery signal may be monitored within a resource pool for D2D reception. The resource pool for D2D reception may be in a form of a super set, when compared to a resource pool for D2D transmission.

A definition of a discovery period may be different based on a discovery type, that is, discovery type 1 and discovery type 2B. In the case of type 1, the discovery period indicates the periodicity of resources allocated for D2D discovery signal transmission within a cell. In the case of type 2B, the discovery period indicates the periodicity of resources for the reception of a D2D discovery signal from a cell. Multiple discovery periods having various lengths may be used. In the case of type 2B, a network may configure a predetermined resource for transmission of a D2D discovery signal.

To determine whether to transmit a D2D discovery signal, a D2D discovery transmission probability may be set.

A D2D UE that executes D2D discovery signal transmission may randomly select resources and transmits a discovery MAC PDU within a discovery period. In this instance, the UE may not transmit a discovery MAC PDU in every discovery period, but may determine a resource through which a discovery MAC PDU is to be transmitted. The UE may determine a resource through which a discovery MAC PDU is to be transmitted, based on a D2D discovery transmission probability. The UE selects discovery resources in a discovery resource set within a set discovery period, randomly (type 1) or based on settings of a network (type 2), and transmits a discovery MAC PDU (repeatedly) on the selected discovery resources.

For example, the D2D discovery transmission probability may be determined based on a period/offset. That is, what number is a discover period in and a time/frequency offset are given, the UE may transmit a D2D discovery signal at a corresponding point.

As another example, the D2D discovery transmission probability may be based on a fixed probability or an adaptive probability. (1) When it is based on the fixed probability, whether to transmit a D2D discovery signal on a discovery resource may be determined based on a random function including a probability value P. (2) When it is based on the adaptive probability, this case may be similar to the case based on the fixed probability but the probability value P may adaptively vary. For example, when D2D discovery signal transmission is not executed in a previous period, the probability value P may increase by k, and when D2D discovery signal transmission is executed, the probability value P may increase by m. Alternatively, the probability value P may increase gradually, and may decrease by a predetermined value when a predetermined condition is satisfied.

In an exemplary embodiment, it is assumed that a D2D synchronization Signal (D2DSS) and a Physical D2D Synchronization Channel (PD2DCH) are located in a resource that is configured by a network or a resource determined in advance, so as to effectively support D2D discovery or D2D communication. Therefore, when a D2DSS or a PD2DSCH is located in a resource for D2D discovery or D2D communication (SA/data), a D2D signal and a Wide Area Network (WAN) signal may be multiplexed in the corresponding resource. Alternatively, a D2D synchronization signal and a D2D synchronization channel may be multiplexed with other signals, independently. The WAN refers to a network that configures a wide coverage in a cellular network and provides mobile UEs with voice/data traffic, and the WAN includes WCDMA, LTE, WiMAX, and the like. Radio access networks are generally referred to as a WAN.

FIGS. 8 to 12 are diagrams illustrating delivery of information among UEs and a BS, for D2D communication, according to an exemplary embodiment. As an example, FIGS. 8 to 12 are flowcharts in association with resource configuration and transmission/reception of signals among a BS, a D2D TxUE, and a D2D RxUE, in associated with D2D discovery signal and data communication.

Figure 8:
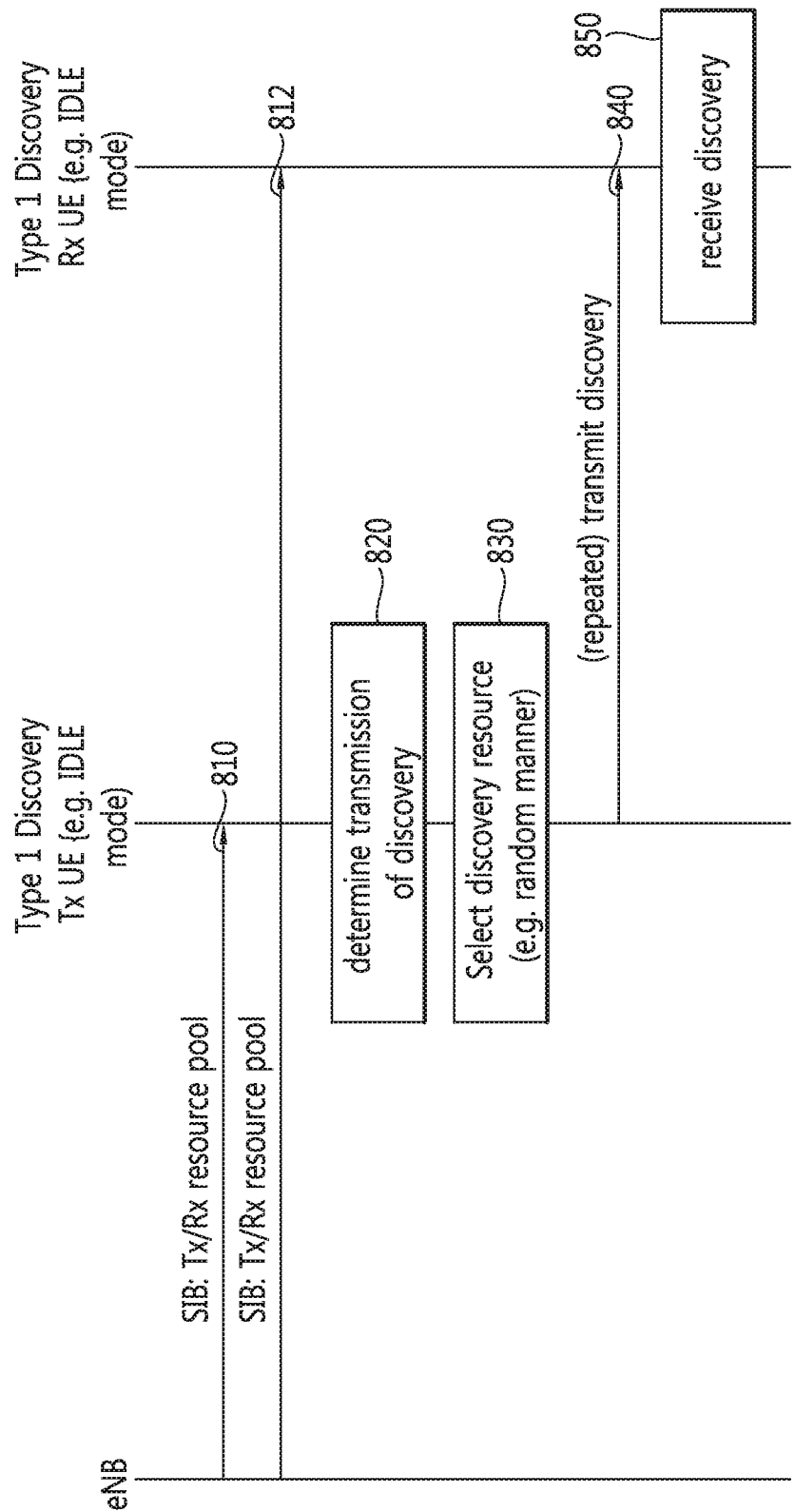
FIG. 8 to FIG. 12 are diagrams illustrating delivery of information among user equipments (UEs) and a base station (BS) for D2D communication, according to one or more exemplary embodiments.

FIG. 8 is a diagram illustrating a process in which an idle mode UE executes transmission/reception of type 1 D2D discovery, in a wireless communication system according to an exemplary embodiment.

Referring to FIG. 8, a TxUE and an RxUE obtain information associated with a TX/RX resource pool from a BS through an SIB, in operations 810 and 812. The TxUE and the RxUE are in an idle mode, the BS broadcasts SIB information so as to provide the information associated with a resource pool for D2D communication.

The TxUE determines discovery transmission in operation 820, and selects a discovery resource of a predetermined time/frequency domain for the discovery transmission, based on the obtained information associated with the resource pool, in operation 830. The discovery resource may be selected based on a random function, and this may be identified based on identification information of the UE.

The TxUE transmits a discovery signal through the selected discovery resource in operation 840. The RxUE receives the discovery signal in operation 850. This may be referred to as discovery type 1.

Figure 9:
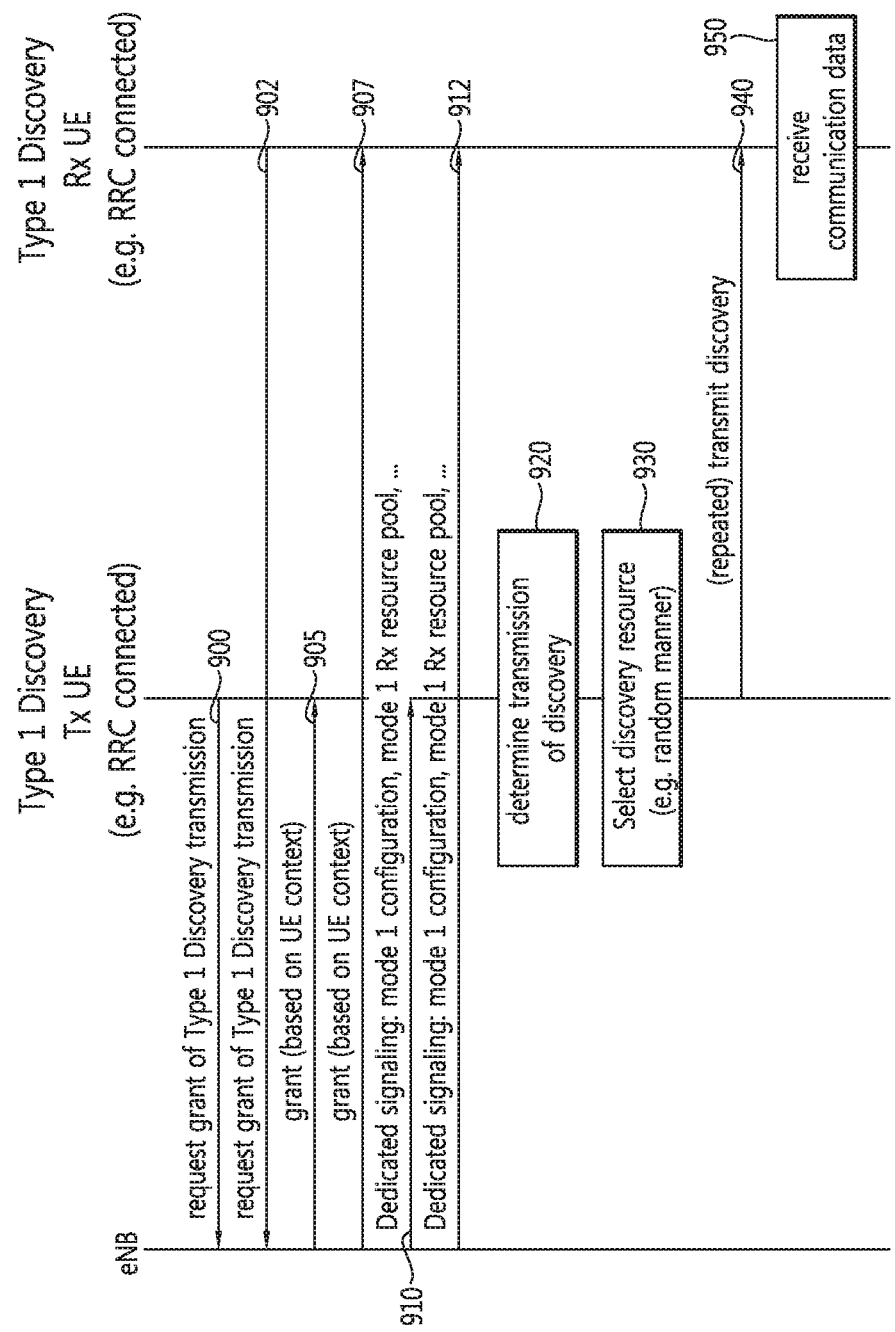

FIG. 9 is a diagram illustrating a process in which an RRC connected mode UE executes transmission/reception of type 1 D2D discovery, in a wireless communication system according to an exemplary embodiment.

When the UE has an RRC connection, type 1 discovery may be set through a dedicated RRC signaling, and a BS may indicate corresponding resource pool information.

Referring to FIG. 9, RRC connected mode TxUE and RxUE request type 1 discovery transmission grant from the BS, in operations 900 and 902. The BS determines a discovery grant request received from each UE, and grants the request based on context of a corresponding UE, in operations 905 and 907.

In this instance, the BS transmits configuration information associated with type 1, information associated with a Tx/Rx resource pool, and the like through a dedicated signaling, to each of the RRC connected mode TxUE and RxUE, in operations 910 and 912. The TxUE and the RxUE are in an RRC connected mode, and the BS may transmit, to each UE, an RRC signaling that includes configuration information for D2D discovery in RRC configuration information.

Subsequently, the TxUE determines discovery transmission in operation 920, and selects a discovery resource of a predetermined time/frequency domain for the discovery transmission, based on the obtained information associated with the resource pool, in operation 930. The discovery resource may be selected based on a random function, and this may be identified based on identification information of the UE. The TxUE transmits a discovery signal through the selected discovery resource in operation 940. The RxUE receives the discovery signal in operation 950. Here, FIG. 9 illustrates a process in which discovery type 1 is executed.

Figure 10:
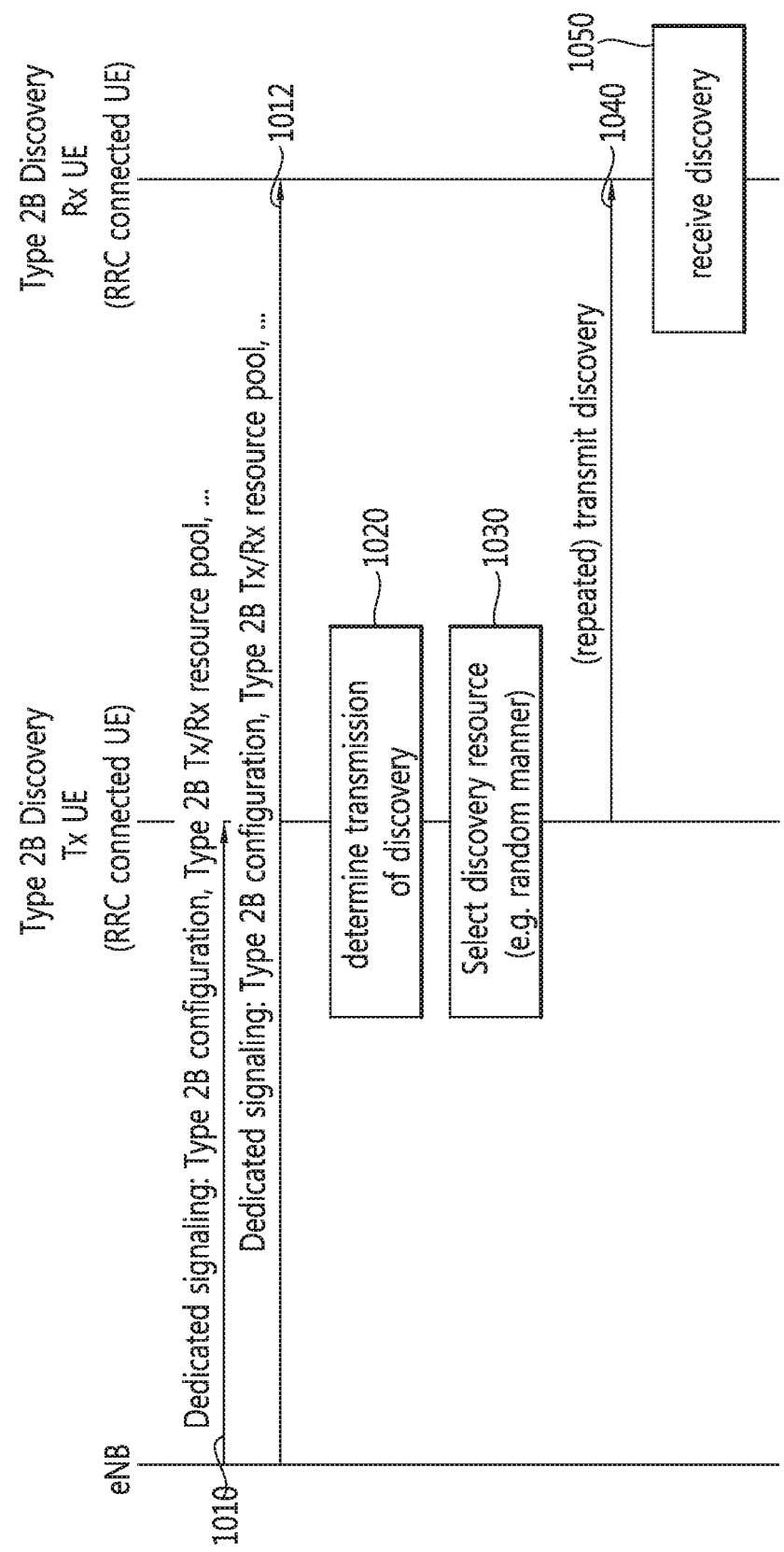

FIG. 10 is a diagram illustrating another example of transmitting and receiving type 2B D2D discovery in an RRC connected mode, in a wireless communication system according to an exemplary embodiment.

Referring to FIG. 10, D2D discovery type 2B is executed in an RRC connected mode. The D2D discovery type 2B is executed in only an RRC connected mode.

As an example, the BS transmits information associated with type 2 and information associated with a Tx/Rx resource pool for Type 2, through a dedicated signaling, to each of the RRC connected mode TxUE and RxUE, in operations 1010 and 1012. As a matter of course, the BS may allow execution of type 2B discovery, based on whether a corresponding UE is capable of executing type 2B discovery, or in response to a request from a UE.

Accordingly, the TxUE determines discovery transmission in operation 1020, and selects/determines a discovery resource of a predetermined time/frequency domain, which is configured through the dedicated signaling in operation 1030.

Therefore, the TxUE transmits a discovery signal through only the configured discovery resource in operation 1040. The RxUE receives the discovery signal in operation 1050. Here, FIG. 10 illustrates a process in which discovery type 2 is executed.

Figure 11:
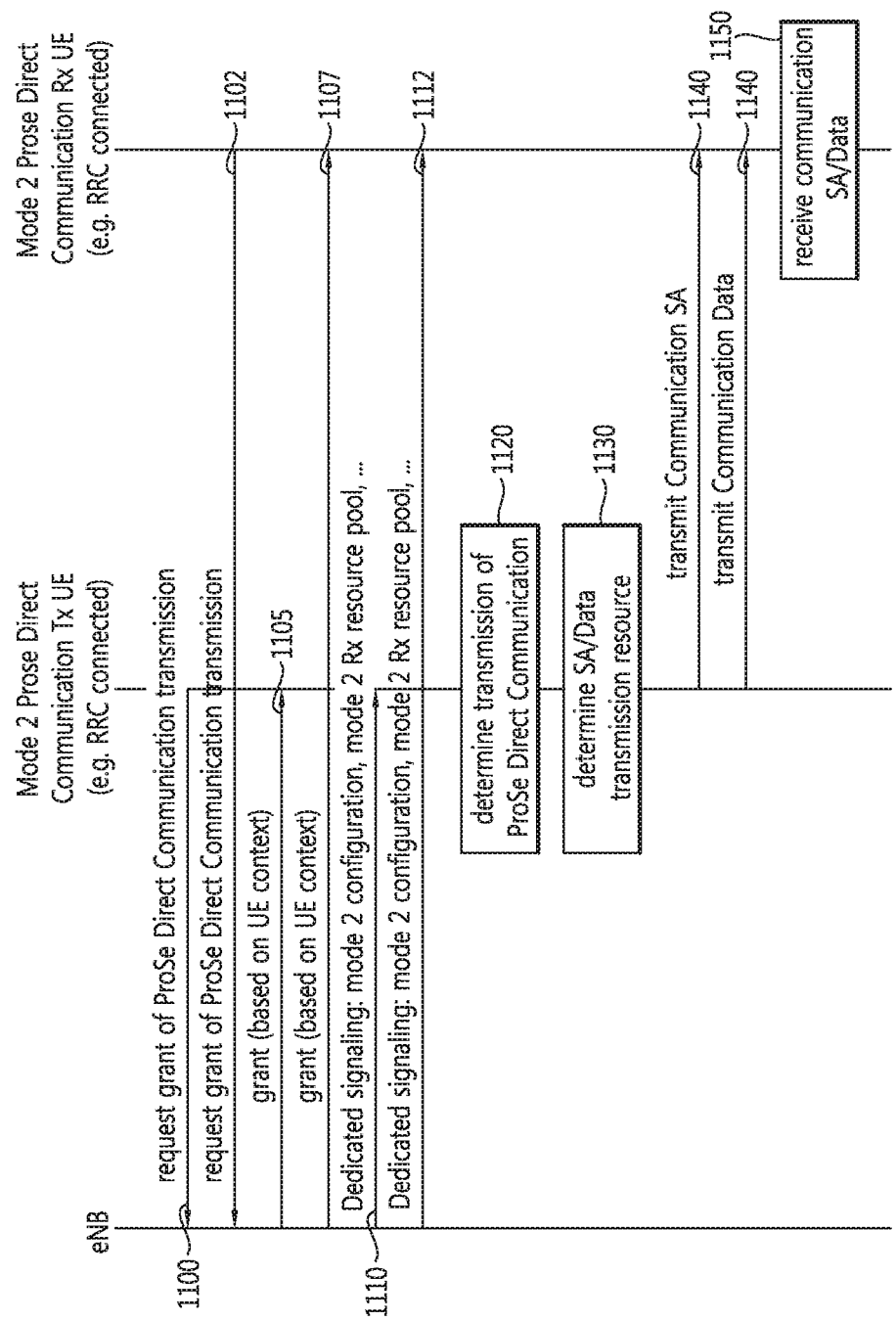

FIG. 11 is a diagram illustrating another process in which D2D data communication is executed in an RRC connected mode, in a wireless communication system according to an exemplary embodiment.

FIG. 11 illustrates a process of executing mode 2 ProSe direct communication before executing mode 2 communication in an RRC connected mode. As an example, the mode 2 operation may be used for an exceptional case such as RLF, and mode 1 operation may be executed as the default. An idle mode UE executes the mode 2 operation based on information indicated by the SIB.

Particularly, the RRC connected mode TxUE and RxUE request ProSe direct communication transmission grant from a BS, in operations 1100 and 1102 The BS determines the ProSe direct communication transmission grant received from each UE, and grants the request based on context of a corresponding UE, in operation 1105 and 1107.

The BS transmits configuration information associated with mode 2 and information associated with a Tx/Rx resource pool for mode 2, through a dedicated signaling, to each of the RRC connected mode TxUE and RxUE, in operations 1110 and 1112. The TxUE and the RxUE are in an RRC connected mode, the BS may transmit, to each UE, an RRC signaling that includes information for the mode 2 D2D data communication in RRC configuration information.

The TxUE determines communication transmission in operation 1120, and selects/determines a resource for communication (SA/data), based on the obtained/configured resource pool information, in operation 1130.

Subsequently, the TxUE transmits communication SA/data through the selected resource, in operation 1140. The RxUE receives the communication data in operation 1150.

Figure 12:
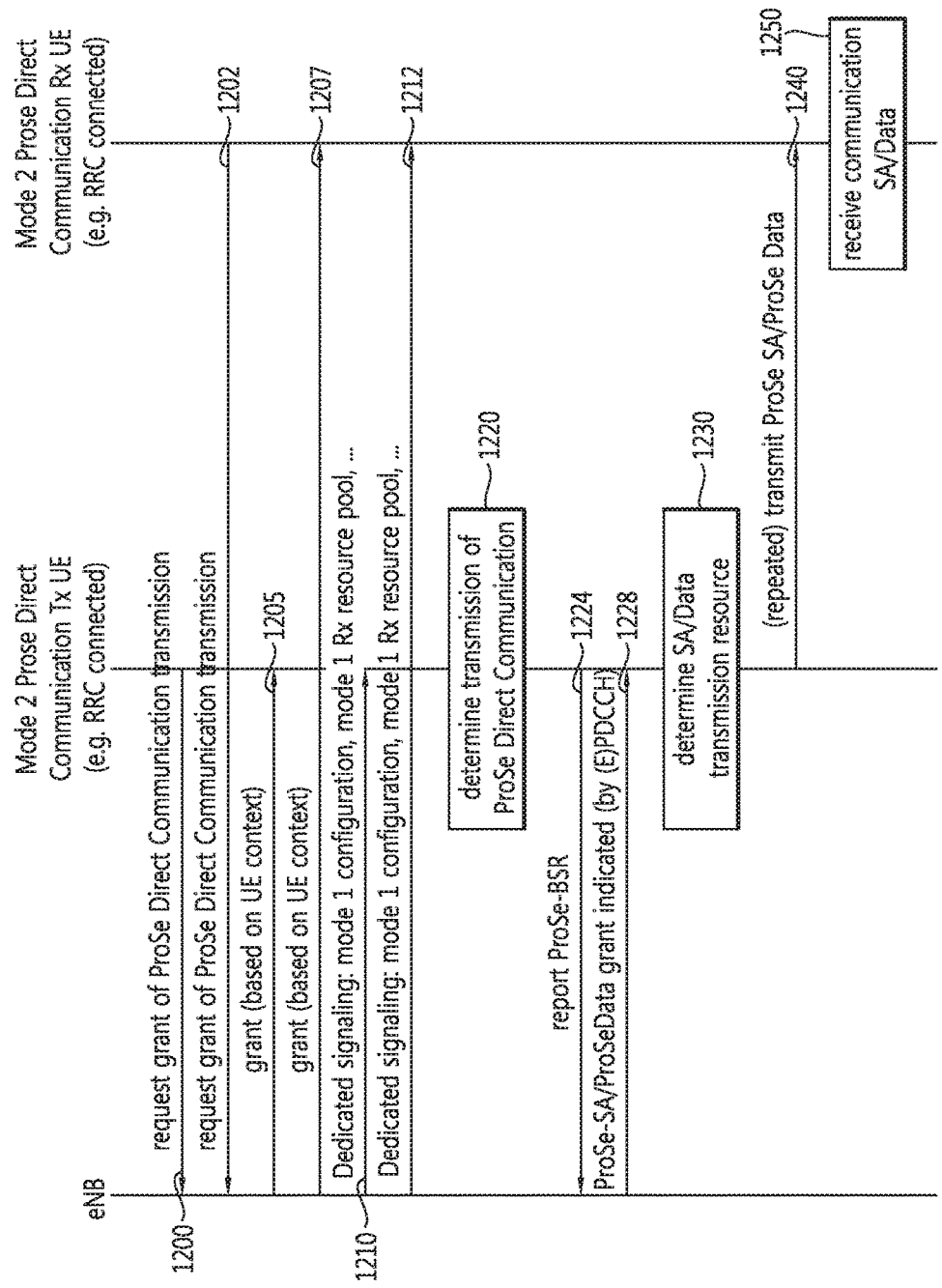

FIG. 12 is a diagram illustrating another process in which D2D data communication is executed in an RRC connected mode, in a wireless communication system according to an exemplary embodiment.

FIG. 12 illustrates a process of executing mode 1 ProSe direct communication before executing mode 1 communication in an RRC connected mode.

Particularly, the RRC connected mode TxUE and RxUE request ProSe direct communication transmission grant from a BS, in operations 1200 and 1202 The BS determines the ProSe direct communication transmission grant received from each UE, and grants the request based on context of a corresponding UE, in operations 1205 and 1207.

The BS transmits configuration information associated with mode 1 and information associated with a Tx/Rx resource pool for mode 1, through a dedicated signaling, to each of the RRC connected mode TxUE and RxUE, in operations 1210 and 1212. The TxUE and the RxUE are in an RRC connected mode, the BS may transmit, to each UE, an RRC signaling that includes information for the mode 1 D2D data communication in RRC configuration information.

The TxUE determines communication transmission in operation 1220, and reports a buffer state associated with the D2D data through a ProSe B SR in operation 1224. The BS that receives the ProSe BSR from the TxUE may allocate a ProSe SA/ProSe data grant for D2D data transmission. The ProSe SA/ProSe data grant may be indicated through a PDCCH or an EPDCCH, in operation 1228.

The TxUE that obtains the ProSe SA/ProSe data grant selects/determines a resource for communication (SA/data) based on the configured resource pool information and the SA/data grant, in operation 1230.

The TxUE transmits ProSe SA/ProSe data (communication data) through the selected resource, in operation 1240. The RxUE receives the communication SA/data in operation 1250.

When a plurality of D2D signals overlap temporally with respect to a single UE, a collision may occur among the D2D signals. However, an existing UE, particularly, a UE having a single transceiver chain, is incapable of executing simultaneous transmissions/receptions through various frequency bands. Accordingly, for effective D2D communication in a licensed band, there is a need of assigning a priority a signal for processing D2D signals when a collision occurs among the D2D signals.

Accordingly, an exemplary embodiment will provide a method of multiplexing D2D signals when a plurality of D2D signals occurs simultaneously. Particularly, a method for a UE having a single transceiver chain to execute multiplexing D2D signals, will be described. Hereinafter, the methods disclosed in an exemplary embodiment may be applicable to a multi-carrier scenario. For example, an exemplary embodiment may be applied to multiplexing of a UE that has a single transceiver chain on a cellular spectrum (carrier #0) and an uplink spectrum (on FDD) for D2D.

A D2D signal may include a D2D discovery signal and a D2D communication signal. The D2D discovery signal may be classified into type 1 and type 2B. A type 1 D2D discovery signal is transmitted on a resource that is randomly selected from a D2D discovery resource set, and a type 2B D2D discovery signal is transmitted on a resource that is configured by settings of a network. The D2D communication signal may include SA and D2D data. SA transmission for D2D communication may be indicated by a DCI format having a size identical to DCI format 0 in the case of mode 1, and may be indicated using a resource randomly selected randomly from a SA resource pool in the case of mode 2.

Here, the SA resource pool may be configured in advance in an out-of-coverage D2D communication scenario, and may be indicated by an SIB/dedicated signaling in an in-coverage/partial-coverage D2D communication scenario. Alternatively, it may be fixed to a predetermined location. For example, it may be fixed to a predetermined location in a resource pool for D2D data transmission.

D2D data is indicated by SA in the both cases, that is, mode 1 and mode 2. A Resource Pattern for Transmission (RPT) may be used for D2D data transmission. In this instance, a pattern for a time domain resource is referred to as a T-RPT, and a pattern for a frequency domain resource is referred to as an F-RPT. However, indication associated with the frequency domain resource may be determined or indicated by a predetermined hopping pattern.

Figure 13:
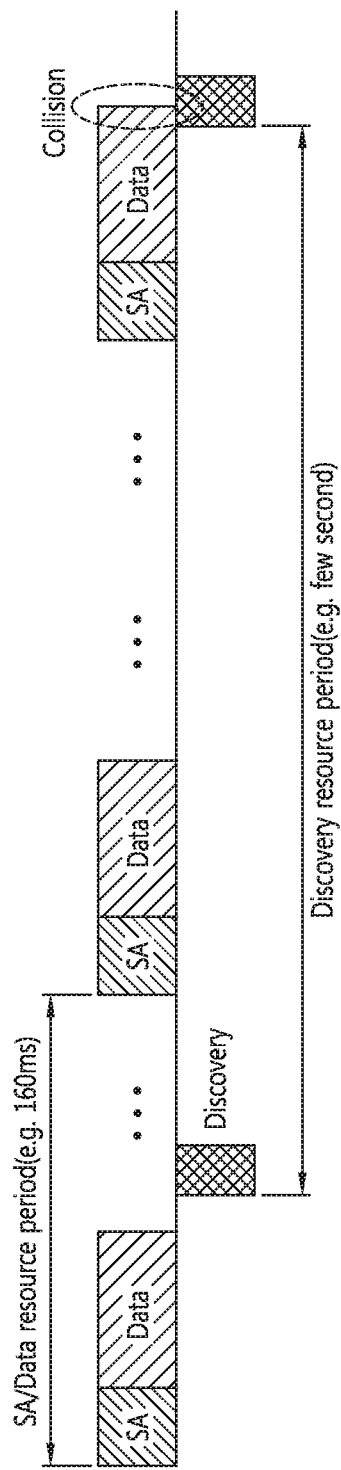
FIG. 13 illustrates an example of a potential collision among D2D signals.
Figure 14:
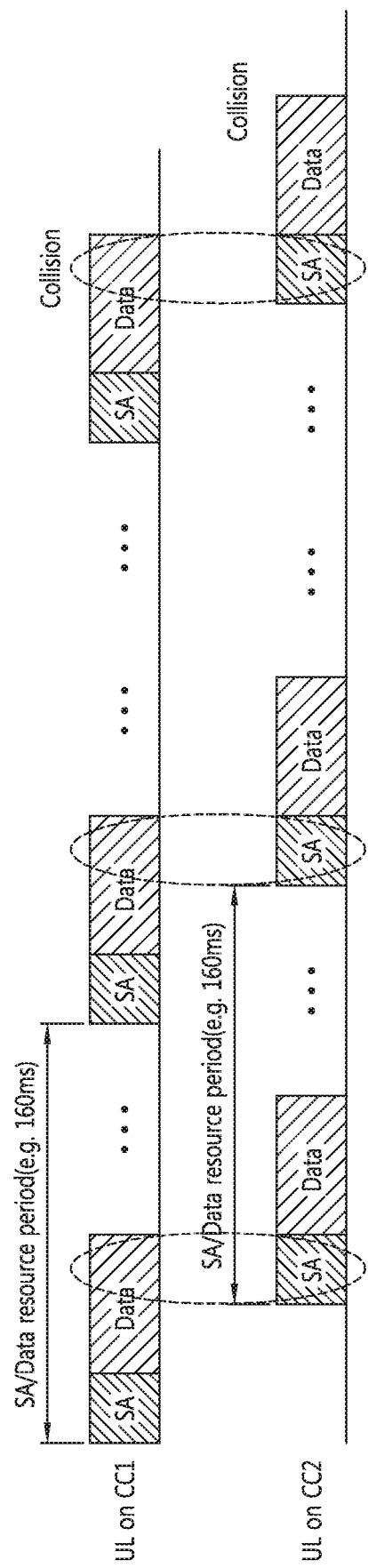
FIG. 14 illustrates another example of a potential collision among D2D signals.

FIG. 13 illustrates an example of a potential collision among D2D signals. FIG. 13 assumes a single carrier scenario. FIG. 14 illustrates an example of a potential collision among D2D signals. FIG. 14 assumes a multi-carrier scenario.

As shown in FIGS. 13 and 14, a collision may occur between a D2D discovery signal and D2D data (or SA) on a single carrier, or a collision may occur between D2D data (or SA) of a carrier and SA(or D2D data) of another carrier. In the case of D2D discovery and D2D communication, a transmission timing may not be controlled by a single network. For example, for reception of an inter-PLMN discovery signal, a corresponding UE may monitor reception of a discovery signal transmitted on another PLMN (or carriers), during a predetermined period of time. In parallel with the above, D2D signal transmission or reception may occur on a serving PLMN (or carriers).

In this instance, a method of multiplexing D2D signals when a plurality of D2D signals are simultaneously generated, according to an exemplary embodiment, will be described as follows.

Before applying the methods of the following embodiments, a D2D synchronization signal and a D2D synchronization channel may execute D2D transmission with a higher priority than other D2D channels. That is, it indicates that the D2D synchronization signal and the D2D synchronization channel may be preferentially transmitted when they overlap temporally or collide with another D2D discovery channel, a D2D control channel (SA), or a D2D data channel, and other D2D channels may not be transmitted or puncturing of partial information thereof may be executed. Particularly, when the D2D synchronization signal collides with a D2D control channel (SA)/data channel, puncturing may be executed with respect to OFDM symbols that overlap the D2D synchronization signal in a subframe through which the D2D control channel is transmitted, and the D2D control channel/data channel may be transmitted together with the D2D synchronization signal. Conversely, when the D2D synchronization channel is transmitted and the D2D synchronization channel collides with other D2D channels, the other D2D channels may not be transmitted. Here, the case of not being transmitted may not indicate all transmissions including retransmission of a D2D channel, but may indicate only a transmission of a D2D channel when a collision occurs.

A method of assigning priorities of the D2D channels remaining after excluding the D2D synchronization signal and the synchronization channel, will be described as follows.

According to an exemplary embodiment, when a collision occurs among D2D signals, a final priority may be determined by combining maximum transmission power level (e.g., Pmax) information in settings of a resource pool configured for a D2D discovery channel and a priority that is based on a channel mentioned in the first embodiment. The maximum transmission power information in the settings for the D2D discovery channel resource pool may be classified as three power levels, that is, maximum/medium/minimum level. Also, the D2D data transmission power may indicate a maximum power or a general open loop power control, based on a TPC command. Accordingly, D2D data transmission to which a maximum power is set may also be considered. Therefore, by taking into consideration a power level of each channel, a channel having a high power has a high priority. When maximum transmission power information of channels that collide are identical to each other, the final priority may be determined in an order of a discovery signal>SA>data according to the first embodiment. A D2D channel having the highest priority may be preferentially transmitted, and remaining channels may be dropped or transmitted through puncturing.

For example, when transmission of a D2D discovery signal (maximum power), a D2D SA signal (maximum power), and D2D data (medium power, open loop power control) occurs on a single carrier with respect to a single UE that executes D2D, a D2D data channel that has a medium power level is dropped first according to the above described method, and a D2D discovery signal is finally transmitted out of the D2D discovery signal and the D2D SA signal having the maximum power, based on a priority item of the corresponding channels.

According to the first embodiment, when a collision occurs among D2D signals, a priority may be assigned in an order of a discovery signal>SA>data, and D2D transmission may be executed based on the same. In this instance, as a main consideration, a discovery signal may have a long transmission period (for example, few seconds), and a delay in reception of a D2D discovery signal may be prevented by receiving a D2D discovery signal preferably within a single discovery period.

For example, when transmission/reception of a discovery signal occurs in parallel with transmission/reception of SA, the transmission/reception of the discovery signal is always prioritized over the transmission/reception of the SA. Therefore, the method may be considered as a method that prioritizes the transmission/reception of a discovery signal.

According to the first embodiment, when a discovery Tx signal and an SA Tx signal are generated in parallel on the same subframe, the SA Tx signal may be dropped. A transmission period of the discovery signal is longer than general D2D communication (SA, data) signals and thus, not missing a discovery signal in a discovery period is important. Therefore, according to the first embodiment, a delay in transmission/reception of a discovery signal may be minimized.

Additionally, when identical D2D signals collide on different carriers (PLMNs or cells), a D2D signal corresponding to a serving cell (or PLMN) may be preferentially transmitted or received.

According to a second embodiment, whether a D2D signal is a Tx signal or an Rx signal is considered to determine a priority. In this instance, whether a D2D signal is a Tx/Rx may be considered as a more important element or a type of D2D signal may be considered as a more importable element, to set a priority. For example, the priority may be set in an order of a discovery Tx>SA Tx>data Tx>discovery Rx>SA Rx>data Rx. As another example, the priority may be set in an order of a discovery Tx>discovery Rx>SA Tx>SA Rx>data Tx>data Rx.

According to the second embodiment, transmission (or reception) of a predetermined D2D signal may be more prioritized than transmission (or reception) of another signal. The second embodiment is based on the priority of the first embodiment. Here, the meaning of 'being based on the priority of the first embodiment' is that the priority is determined by considering the feature of a D2D signal based on the first embodiment and considering whether a type of the D2D signal is a Tx/Rx according to the second embodiment when events with an identical priority exists. This also means that the priority of the second embodiment is considered first and, when events with an identical priority exists, considerations of the first embodiment may be used, to determine a priority. Alternatively, the priority may be determined irrespective of the priority of the first embodiment.

A third embodiment determines priorities of D2D signals based on at least one of a D2D communication mode and a discovery type.

Particularly, the priorities of the D2D signals may be determined based on D2D communication mode 1/2 and D2D discovery type 1/2B. For example, the priority may be determined in an order of type 2B discovery>mode 1 SA>mode 1 data>type 1 discovery>mode 2 SA>mode 2data. The embodiment is a method of determining a priority based on at least one of a D2D signal transmission mode and a D2D signal type. A type 2B discovery signal is transmitted using a resource designated by a network. Therefore, using the resource for the signal may be preferentially requested. Also, when the frequency of transmission of the signal is considered together, the type 2B discovery signal may be a D2D signal having the highest priority. Similarly, SA of mode 1 is a resource that is also designated based on a DCI of a network, and thus, may have a high priority.

In addition to the embodiments, a fourth embodiment regards a D2D signal that is temporally earlier as a signal with a higher priority, when multiple carriers are configured for a UE. The method may determine D2D resources configured on multiple carriers, and may determine a priority based on the same. The fourth embodiment may be optionally considered.

The first to fourth embodiments are exclusive, and one of the embodiments may be used or at least one of the embodiments may be used together. For example, by combining the third embodiment and the second embodiment, the following priority may be obtained. For example, type 2B discovery Tx/Rx>mode 1 SA Tx/Rx>mode 1 data Tx/Rx>taype 1 discovery Tx>mode 2 SA Tx>mode 2 data Tx>type 1 discovery Rx>mode 2 SA Rx>mode 2 data Rx.

What is meant here is that a condition of one of the mentioned four embodiments is considered first, and when events with an identical priority exists, a condition of another embodiment may be considered. Therefore, the intention is to enable a UE to determine final priorities of corresponding D2D signals.

According to the method according to an exemplary embodiment, when a UE has a single transceiver chain, a signal having a low priority may be dropped. This may be equally applied to a single carrier environment or multi-carrier environment.

Alternatively, even in the case where the UE has an independent transceiver chain, when D2D signals are simultaneously generated on multiple carriers and the transmission power of the D2D signals exceed PCMAX that is a maximum output power configured for the UE (a total configured maximum output power), the D2D signals may be selectively dropped or power scaling may be executed (for example, decreasing Tx power) based on a priority. Power scaling refers to reduction of a transmission power based on a predetermined scale, so as to allocate power that does not exceed a total transmission power of a UE. An example of power scaling is multiplexing an original transmission power by a scaling factor. The power scaling may be expressed variously, such as power adjustment, power-scale down, or the like. That is, according to an exemplary embodiment, D2D signals are distinguished based on a priority and power scaling may be selectively executed.

Figure 15:
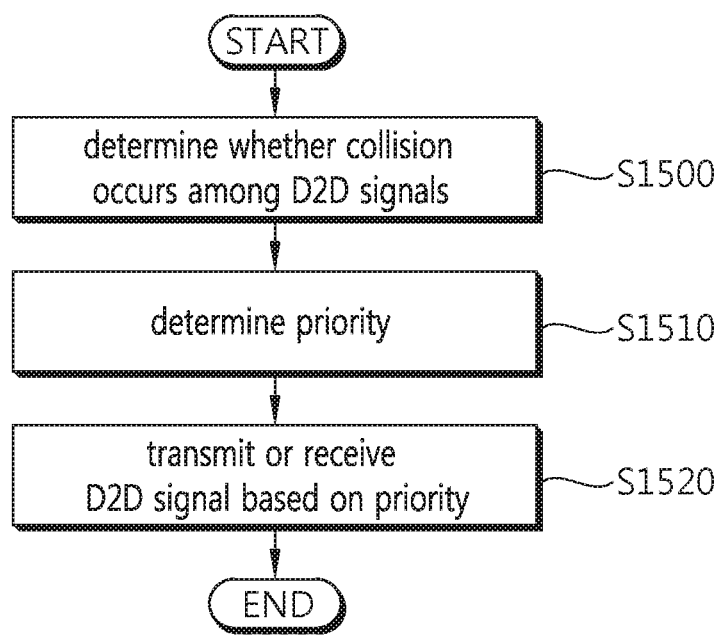
FIG. 15 is a flowchart illustrating operations of a User Equipment (UE) according to one or more exemplary embodiments.

FIG. 15 is an example of a flowchart illustrating operations of a UE according to an exemplary embodiment.

Referring to FIG. 15, the UE determines whether a collision occurs among D2D signals in operation S1500. That is, it is determined whether a collision occurs since a plurality of D2D signals are set or scheduled to be simultaneously transmitted/received in an identical spectrum/subframe.

When the collision occurs, the UE determines priorities of the plurality of D2D signals, so as to determine a D2D signal to be processed, in operation S1510. The UE may determine the priorities for determining a signal to be processed(or transmitted/received) out of the plurality of D2D signals, and executes multiplexing, based on at least one of the first to the fourth embodiments.

As an example, the priority may be determined based on a type of D2D signal, for example, in an order of a discovery signal>SA>data.

As another example, the priority may be determined based on whether a D2D signal is a Tx signal or an Rx signal.

As another example, the priority may be determined based on at least one of a D2D communication mode and a discovery type.

As another example, a D2D signal that is temporally earlier than other signals may be regarded as a signal with a higher priority. This corresponds to the case in which multiple carriers are configured for the UE.

When D2D signals colliding into each other have the same priority in association with the priority considered first out of the above described examples, another priority out of the remaining examples may be considered. Therefore, the above mentioned priority examples may be sequentially considered.

Based on the determination, the UE transmits or receives a D2D signal with a high priority, which is selected out of the plurality of D2D signals based on the priority, in operation S1520. Also, when the D2D signals are simultaneously generated on the multiple carriers and the transmission power of the D2D signals exceed a PCMAX, the UE may (selectively) drop the D2D signals or execute power scaling based on the priority.

Figure 16:
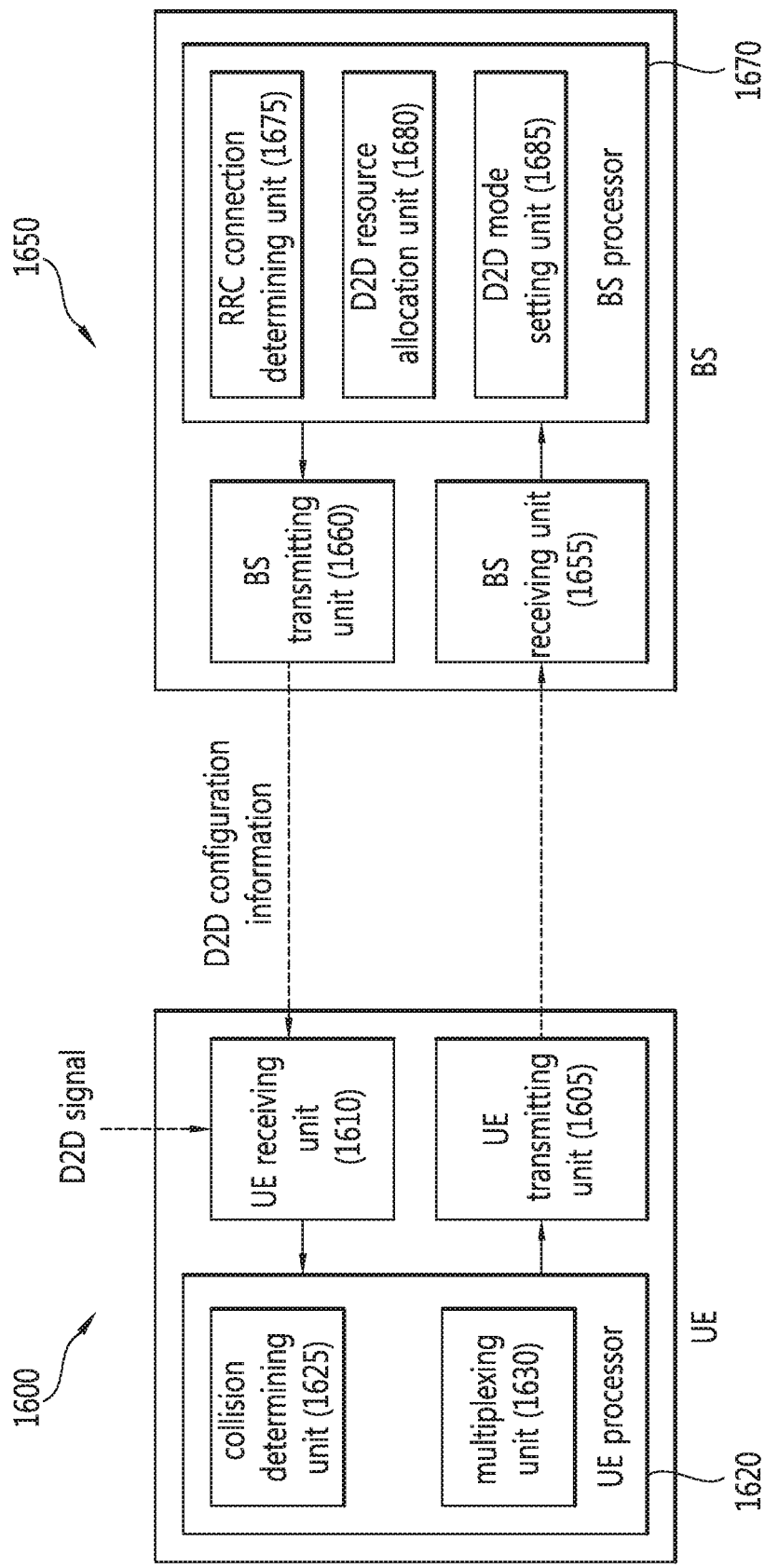
FIG. 16 is an example of a block diagram illustrating a UE according to one or more exemplary embodiments.

FIG. 16 is an example of a block diagram illustrating a UE according to an exemplary embodiment.

Referring to FIG. 16, a UE 1600 includes a UE transmitting unit 1605, a UE receiving unit 1610, and a UE processor 1620. The UE may further include a memory (not illustrated). The memory is connected with the UE processor 1620, and store various pieces of information used for operating the UE processor 1620. In the above described embodiments, the operations of the UE 1600 may be implemented by a control of the processor 1620. The UE processor 1620 may further include a collision determining unit 1625 and a multiplexing unit 1630.

The UE transmitting unit 1605 executes transmission of a D2D signal.

The UE receiving unit 1610 executes reception of a D2D signal.

The collision determining unit 1625 may determine whether a collision occurs since a plurality of D2D signals are set or scheduled to be simultaneously transmitted/received in an identical spectrum/sub frame.

The multiplexing unit 1630 may determine the priorities of the plurality of D2D signals so as to decide a signal to be processed in a corresponding spectrum/subframe, and execute multiplexing, based on at least one of the first to the fourth embodiments. The multiplexing unit 1630 may be referred to as a scheduling unit in respect that the unit schedules a signal to be transmitted/received, may be referred to as a priority determining unit in respect that the unit determines the priorities of the D2D signals colliding into each other, and may be referred to as a selecting unit in respect that the unit selects a signal to be processed out of the plurality of D2D signals.

For example, the multiplexing unit 1630 may determine the priorities of the D2D signals having a collision, in an order of a discovery signal>SA>data.

As another example, the multiplexing unit 1630 may determine the priorities of the D2D signals having a collision, based on whether a D2D signal is a Tx signal or an Rx signal.

As another example, the multiplexing unit 1630 may determine the priorities of the D2D signals having a collision, based on at least one of a D2D communication mode and a discovery type.

As another example, the multiplexing unit 1630 may determine a D2D signal that is temporally earlier as a signal with a higher priority than other signals. This corresponds to the case in which multiple carriers are configured for the UE 1600.

The UE processor 1620 may further include a power controller (not illustrated). The power controller may determine whether D2D signals are simultaneously generated on the multiple carriers and the transmission power for the D2D signals exceed PCMAX, and when the transmission power for the D2D signals exceed PCMAX, the power controller may executes power scaling (selectively) with respect to the D2D signals based on a priority.

A BS 1650 includes a BS receiving unit 1655, a BS transmitting unit 1660, and a BS processor 1670. The BS 1650 may further include a memory (not illustrated). The memory is connected with the BS processor 1670, and stores various pieces of information used for operating the BS processor 1670. In the above described embodiments, the operations of the BS 1650 may be implemented by a control of the processor 1670. The BS processor 1670 may include an RRC connection determining unit 1675, a D2D resource allocation unit 1680, and a D2D mode setting unit 1685.

The BS transmitting unit 1655 may transmit D2D configuration information to the UE 1600.

The RRC connection determining unit 1675 may determine whether the UE 1600 is in an idle mode or an RRC connected mode. The D2D mode setting unit 1685 may set a D2D mode of the UE 1600.

The D2D resource allocation unit 1680 may generate information associated with a resource pool for D2D communication, based on whether the UE 1600 is in an idle mode or an RRC connected mode. Also, the D2D resource allocation unit 1680 may generate D2D configuration information. The D2D configuration information may include configuration information associated with a D2D discovery type 1/type 2, information associated with a corresponding Tx/Rx resource pool, and the like. The D2D configuration information may include information associated with a D2D resource pool for D2D mode2/mode1. A monitoring resource associated with D2D discovery reception may be configured in a form of a subset, which is smaller than or equal to the D2D discovery resource pool. The D2D configuration information may include information associated with a D2D monitoring period (monitoring resource information). The monitoring resource information may include only information associated with a period where D2D signals of D2D UEs that access a network of a single operator is monitored, or may include information associated with a period where D2D signals of D2D UEs that access the network of the single operator is monitored and information associated with a period where D2D signals of D2D UEs that access a network of another operator is monitored.

According to an exemplary embodiment, a Tx UE may include a wireless transceiver (not shown). The UE receiving unit 1610 and the UE transmitting unit 1605 may be configured as a single wireless transceiver or a separate wireless transceivers. In an exemplary embodiment, the term "wireless transceiver" may be used to describe one of the above communication units or transceivers.

The wireless transceiver may receive resource assignment information transmitted from an evolved NodeB (eNB) and transmit a D2D discovery signal to a Rx UE. The resource assignment information may be associated with a D2D discovery signal to be transmitted in a discovery period.

One or more processors, e.g., the UE processors 1620, may be configured to determine that a D2D discovery signal associated with a first discovery type and a D2D discovery signal associated with a second discovery type are to be transmitted in a first subframe included in the discovery period. The one or more processors may be configured to, in the first subframe, transmit the D2D discovery signal associated with the second discovery type and drop the D2D discovery signal associated with the first discovery type.

The first discovery type may correspond to discovery type 1 for a D2D discovery signal transmission, and the second discovery type may correspond to discovery type 2B for a D2D discovery signal transmission. The wireless transceiver may be configured to receive information of resource pool for a D2D discovery signal transmission associated with the discovery type 1, and the one or more processor may be configured to randomly select a transmission resource within the resource pool to execute the D2D discovery signal transmission associated with the discovery type 1.

The wireless transceiver may be configured to receive information of dedicated discovery resource for a D2D discovery signal transmission associated with the discovery type 2B, the information of dedicated discovery resource being transmitted from the eNB, and the wireless transceiver may be configured to execute the D2D discovery signal transmission associated with the discovery type 2B using the dedicated discovery resource.

The wireless transceiver may be configured to transmit the D2D discovery signal associated with the first discovery type in a second subframe in response to determining, by the one or more processors, that the D2D discovery signal associated with the second discovery type is not scheduled for transmission in the second subframe, wherein the second subframe is included in the discovery period.

The one or more processor may be configured to drop a D2D control signal transmission in response to determining that a D2D discovery signal and the D2D control signal are to be transmitted in a second subframe. In the second subframe, the wireless transceiver may be configured to transmit the D2D discovery signal without transmitting the D2D control signal, wherein the second subframe is included in the discovery period.

The one or more processor may be configured to drop a D2D data signal transmission in response to determining that a D2D discovery signal and the D2D data signal are to be transmitted in a second subframe. In the second subframe, the wireless transceiver is configured to transmit the D2D discovery signal without transmitting the D2D data signal, wherein the second subframe is included in the discovery period.

According to an exemplary embodiment, the wireless transceiver of the Tx UE may receive configuration information for a D2D communication from an eNB, and receive information of a resource pool transmitted from the eNB. The information of the resource pool may be associated with a first D2D discovery signal transmission. Further, the wireless transceiver may receive discovery resource information associated with a second D2D discovery signal transmission, the discovery resource information indicating a specific resource for the second D2D discovery signal transmission. The one or more processors of the UE may determine the second D2D discovery signal transmission through the specific resource, the specific resource comprising a first subframe and a second subframe. The one or more processors of the UE may determine the first D2D discovery signal transmission through a resource selected from the resource pool, the selected resource comprising the second subframe and a third subframe. Then, the one or more processors may execute the second D2D discovery signal transmission in the second subframe, and drop the first D2D discovery signal transmission in the second subframe.

The first D2D discovery signal transmission may be associated with discovery type 1, and the second D2D discovery signal transmission may be associated with discovery type 2B. The one or more processors may execute the second D2D discovery signal transmission in the first subframe. The one or more processors may determine that the second D2D discovery signal transmission is not executed in the third subframe, and execute the first D2D discovery signal transmission in the third subframe.

In the described exemplary system, although methods are described based on a flowchart as a series of steps or blocks, aspects are not limited thereto. It is understood that the specific order or hierarchy of steps in the processes disclosed is an illustration of exemplary approaches. Based on design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A transmission (Tx) wireless device comprising:
a wireless transceiver comprising an antenna and configured to:
receive resource assignment information transmitted from an evolved NodeB (eNB), the resource assignment information being associated with one or more discovery signals to be transmitted in a discovery period; and
transmit one or more discovery signals to a reception (Rx) wireless device; and
one or more processors configured to:
determine that a first discovery signal associated with a first discovery type and a second discovery signal associated with a second discovery type are to be transmitted in a first subframe included in the discovery period; and
in the first subframe, transmit the second discovery signal associated with the second discovery type and drop the first discovery signal associated with the first discovery type,
wherein the one or more processors is configured to drop a transmission of a control signal in response to determining that a third discovery signal and the control signal are to be transmitted in a second subframe, and
wherein in the second subframe, the wireless transceiver is configured to transmit the third discovery signal without transmitting the control signal, wherein the second subframe is included in the discovery period.

2. The Tx wireless device of claim 1, wherein:
the first discovery type corresponds to discovery type 1 for a device-to-device (D2D) discovery signal transmission; and
the second discovery type corresponds to discovery type 2B for a D2D discovery signal transmission.

3. The Tx wireless device of claim 2, wherein the wireless transceiver is configured to receive information of a resource pool for a D2D discovery signal transmission associated with the discovery type 1, and
the one or more processors is configured to randomly select a transmission resource within the resource pool to execute the D2D discovery signal transmission associated with the discovery type 1.

4. The Tx wireless device of claim 2, wherein the wireless transceiver is configured to receive information of a dedicated discovery resource for a D2D discovery signal transmission associated with the discovery type 2B, the information of the dedicated discovery resource being transmitted from the eNB; and wherein the wireless transceiver is configured to execute the D2D discovery signal transmission associated with the discovery type 2B using the dedicated discovery resource.

5. The Tx wireless device of claim 1, wherein the wireless transceiver is configured to transmit the first discovery signal associated with the first discovery type in a third subframe in response to determining, by the one or more processors, that the second discovery signal associated with the second discovery type is not scheduled for transmission in the third subframe, wherein the third subframe is included in the discovery period.

6. The Tx wireless device of claim 1, wherein the one or more processors is configured to drop a transmission of a data signal in response to determining that a discovery signal and the data signal are to be transmitted in a third subframe; and wherein in the third subframe, the wireless transceiver is configured to transmit the discovery signal without transmitting the data signal, wherein the third subframe is included in the discovery period.

7. The Tx wireless device of claim 1, wherein the one or more processors is configured to drop a transmission of a control signal in response to determining that a discovery signal and the control signal are to be transmitted in a third subframe; and wherein in the third subframe, the wireless transceiver is configured to transmit the discovery signal without transmitting the control signal, wherein the third subframe is included in the discovery period.

8. A transmission (Tx) wireless device comprising:

a wireless transceiver comprising an antenna and configured to:

receive resource assignment information transmitted from an evolved NodeB (eNB), the resource assignment information being associated with one or more discovery signals to be transmitted in a discovery period; and transmit one or more discovery signals to a reception (Rx) wireless device; and one or more processors configured to:

determine that a first discovery signal associated with a first discovery type and a second discovery signal associated with a second discovery type are to be transmitted in a first subframe included in the discovery period; and in the first subframe, transmit the second discovery signal associated with the second discovery type and drop the first discovery signal associated with the first discovery type, wherein the wireless transceiver is configured to transmit the first discovery signal associated with the first discovery type in a second subframe in response to determining, by the one or more processors, that the second discovery signal associated with the second discovery type is not scheduled for transmission in the second subframe, wherein the second subframe is included in the discovery period.

9. The Tx wireless device of claim 8, wherein:

the first discovery type corresponds to discovery type 1 for a device-to-device (D2D) discovery signal transmission; and the second discovery type corresponds to discovery type 2B for a D2D discovery signal transmission.

10. The Tx wireless device of claim 9, wherein the wireless transceiver is configured to receive information of a resource pool for a D2D discovery signal transmission associated with the discovery type 1, and the one or more processors is configured to randomly select a transmission resource within the resource pool to execute the D2D discovery signal transmission associated with the discovery type 1.

11. The Tx wireless device of claim 9, wherein the wireless transceiver is configured to receive information of a dedicated discovery resource for a D2D discovery signal transmission associated with the discovery type 2B, the information of the dedicated discovery resource being transmitted from the eNB, and wherein the wireless transceiver is configured to execute the D2D discovery signal transmission associated with the discovery type 2B using the dedicated discovery resource.

12. The Tx wireless device of claim 8, wherein the one or more processors is configured to drop a transmission of a control signal in response to determining that a discovery signal and the control signal are to be transmitted in a third subframe, and wherein in the third subframe, the wireless transceiver is configured to transmit the discovery signal without transmitting the control signal, wherein the third subframe is included in the discovery period.

13. The Tx wireless device of claim 8, wherein the one or more processors is configured to drop a transmission of a data signal in response to determining that a discovery signal and the data signal are to be transmitted in a third subframe, and wherein in the third subframe, the wireless transceiver is configured to transmit the discovery signal without transmitting the data signal, wherein the third subframe is included in the discovery period.

14. A transmission (Tx) wireless device comprising:

a wireless transceiver comprising an antenna and configured to:

receive resource assignment information transmitted from an evolved NodeB (eNB), the resource assignment information being associated with one or more discovery signals to be transmitted in a discovery period; and transmit one or more discovery signals to a reception (Rx) wireless device; and one or more processors configured to:

determine that a first discovery signal associated with a first discovery type and a second discovery signal associated with a second discovery type are to be transmitted in a first subframe included in the discovery period; and in the first subframe, transmit the second discovery signal associated with the second discovery type and drop the first discovery signal associated with the first discovery type, wherein the one or more processors is configured to drop a transmission of a data signal in response to determining that a third discovery signal and the data signal are to be transmitted in a second subframe, and wherein in the second subframe, the wireless transceiver is configured to transmit the third discovery signal without transmitting the data signal, wherein the second subframe is included in the discovery period.

15. The Tx wireless device of claim 14, wherein:
the first discovery type corresponds to discovery type 1 for a device-to-device (D2D) discovery signal transmission; and
the second discovery type corresponds to discovery type 2B for a D2D discovery signal transmission.

16. The Tx wireless device of claim 15, wherein the wireless transceiver is configured to receive information of a resource pool for a D2D discovery signal transmission associated with the discovery type 1, and
the one or more processors is configured to randomly select a transmission resource within the resource pool to execute the D2D discovery signal transmission associated with the discovery type 1.

17. The Tx wireless device of claim 15, wherein the wireless transceiver is configured to receive information of a dedicated discovery resource for a D2D discovery signal transmission associated with the discovery type 2B, the information of the dedicated discovery resource being transmitted from the eNB; and
wherein the wireless transceiver is configured to execute the D2D discovery signal transmission associated with the discovery type 2B using the dedicated discovery resource.

18. The Tx wireless device of claim 14, wherein the wireless transceiver is configured to transmit the first discovery signal associated with the first discovery type in a third subframe in response to determining, by the one or more processors, that the second discovery signal associated with the second discovery type is not scheduled for transmission in the third subframe, wherein the third subframe is included in the discovery period.

* * * * *